(12) United States Patent
Zeiler et al.

(10) Patent No.: US 9,027,314 B2
(45) Date of Patent: May 12, 2015

(54) PACKAGING MACHINE AND PACKAGES MADE THEREWITH

(75) Inventors: Bernhard Zeiler, Moore, SC (US);
Charles D. Buis, Greenwood, SC (US);
Neal Burgess, Jonesville, SC (US);
James A. Renninger, Inman, SC (US);
John B. Manly, Jr., Moore, SC (US)

(73) Assignee: Milliken & Company, Spartanburg, SC (US)

( * ) Notice: Subject to any disclaimer, the term of this patent is extended or adjusted under 35 U.S.C. 154(b) by 1176 days.

(21) Appl. No.: 12/975,490

(22) Filed: Dec. 22, 2010

(65) Prior Publication Data

US 2011/0088351 A1    Apr. 21, 2011

Related U.S. Application Data

(62) Division of application No. 11/985,456, filed on Nov. 15, 2007, now abandoned.

(51) Int. Cl.
*B65B 9/06* (2012.01)
*B65B 9/20* (2012.01)
(Continued)

(52) U.S. Cl.
CPC ............... *B65B 9/2021* (2013.01); *B29C 53/50* (2013.01); *B29C 65/18* (2013.01); *B29C 65/30* (2013.01); *B29C 66/03241* (2013.01); *B29C 66/1122* (2013.01); *B29C 66/133* (2013.01); *B29C 66/301* (2013.01); *B29C 66/4312* (2013.01); *B29C 66/4322* (2013.01); *B29C 66/49* (2013.01); *B29C 66/723* (2013.01); *B29C 66/80* (2013.01); *B29C 66/816* (2013.01); *B29C 66/81821* (2013.01); *B29C 66/8322* (2013.01); *B29C 66/8324* (2013.01); *B29C 66/83241* (2013.01); *B29C 66/83413* (2013.01); *B29C 66/83523* (2013.01); *B29C 66/83533* (2013.01);
(Continued)

(58) Field of Classification Search
USPC ................ 53/550, 551, 554, 555, 451, 374.8, 53/266.1
See application file for complete search history.

(56) References Cited

U.S. PATENT DOCUMENTS 3,092,248 A    6/1963    Lane et al.
3,874,976 A *  4/1975    MacFarland, Jr. ............ 156/515
(Continued)

FOREIGN PATENT DOCUMENTS

CH    379398    6/1964
DE    19809677  9/1999
EP    0870681   10/1999

OTHER PUBLICATIONS

International Search Report. PCT/US2008/012648 date of mailing Sep. 15, 2009.

*Primary Examiner* — Sameh Tawfik
(74) *Attorney, Agent, or Firm* — Brenda D. Wentz

(57) ABSTRACT

Provided herein is a liquid-filled, non-reclosable tetrahedral or pillow-shaped packaging container having a longitudinal fin seal and a pair of transverse seals. In the case of tetrahedral packages, the transverse seals are perpendicular to one another. Also provided herein is an apparatus for the formation of such fin seals as part of a continuous packaging and filling operation. A third aspect of the apparatus of the present disclosure is the development of a heated jaw that exhibits consistent heating across the jaw face. Yet another feature of the apparatus of the present disclosure is provided in a modified, closed-loop electrical system for real-time monitoring and adjustment of the temperatures of the heated jaws, as they are moving.

11 Claims, 21 Drawing Sheets

(51) Int. Cl.
*B29C 53/50* (2006.01)
*B29C 65/18* (2006.01)
*B29C 65/30* (2006.01)
*B29C 65/00* (2006.01)
*B65B 9/12* (2006.01)
*B65B 9/207* (2012.01)
*B65B 51/30* (2006.01)
*B65D 75/50* (2006.01)
*B29L 9/00* (2006.01)
*B29L 31/00* (2006.01)

(52) U.S. Cl.
CPC ...... *B29C 66/8491* (2013.01); *B29C 66/91231* (2013.01); *B29C 66/91421* (2013.01); *B29L 2009/00* (2013.01); *B29L 2031/7166* (2013.01); *B65B 9/12* (2013.01); *B65B 9/2056* (2013.01); *B65B 9/207* (2013.01); *B65B 51/306* (2013.01); *B65B 2220/08* (2013.01); *B65B 2220/10* (2013.01); *B65D 75/50* (2013.01); *B29C 65/305* (2013.01); *B29C 66/0044* (2013.01); *B29C 66/91212* (2013.01); *B29C 66/9161* (2013.01); *B29C 66/81427* (2013.01); *B29C 66/961* (2013.01)

(56) References Cited

U.S. PATENT DOCUMENTS

| | | | |
|---|---|---|---|
| 4,074,504 A * | 2/1978 | Greenawalt et al. | 53/433 |
| 4,288,965 A | 9/1981 | James | |
| 4,301,927 A | 11/1981 | Carlsson et al. | |
| 4,331,288 A | 5/1982 | Lothman | |
| 4,343,402 A | 8/1982 | Holstrom | |
| 4,367,842 A | 1/1983 | Rausing | |
| 4,461,667 A | 7/1984 | Pupp | |
| 4,506,494 A | 3/1985 | Shimoyama et al. | |
| 4,563,862 A | 1/1986 | Howell | |
| 4,637,199 A * | 1/1987 | Steck et al. | 53/451 |
| 4,663,917 A | 5/1987 | Taylor et al. | |
| 4,691,499 A | 9/1987 | Umeda et al. | |
| 4,757,668 A | 7/1988 | Klinkel et al. | |
| 4,866,914 A * | 9/1989 | Moribe | 53/479 |
| 5,203,145 A | 4/1993 | Kammler et al. | |
| 5,222,813 A | 6/1993 | Kopp et al. | |
| 5,255,497 A | 10/1993 | Zoromski et al. | |
| 5,255,842 A | 10/1993 | Rosen | |
| 5,412,927 A * | 5/1995 | Miyazaki et al. | 53/552 |
| 5,488,812 A | 2/1996 | Stark et al. | |
| 5,518,578 A | 5/1996 | Persells et al. | |
| 5,649,407 A | 7/1997 | Blomqvist | |
| 5,775,055 A * | 7/1998 | Giacomelli et al. | 53/371.2 |
| 5,787,690 A * | 8/1998 | Konno | 53/550 |
| 5,843,540 A | 12/1998 | Heydarpour et al. | |
| 6,035,604 A * | 3/2000 | Gustafsson | 53/64 |
| 6,048,295 A | 4/2000 | Olsen | |
| 6,094,892 A | 8/2000 | Lees | |
| 6,155,029 A | 12/2000 | Surendra | |
| 6,253,994 B1 | 7/2001 | Mogard | |
| 6,502,372 B1 | 1/2003 | Kanko et al. | |
| 6,622,459 B1 | 9/2003 | Alfonso | |
| 6,651,848 B1 | 11/2003 | Redmond | |
| 6,684,609 B1 | 2/2004 | Bassissi et al. | |
| 6,764,576 B1 | 7/2004 | Heinonen et al. | |
| 7,017,796 B2 | 3/2006 | Ishikawa | |
| 7,104,028 B2 * | 9/2006 | Paradisi et al. | 53/374.5 |
| 7,147,145 B2 | 12/2006 | Kortsmit et al. | |
| 7,617,658 B2 | 11/2009 | Nemkov et al. | |
| 7,673,434 B2 | 3/2010 | Kinoshita | |
| 8,124,915 B2 * | 2/2012 | Bertram et al. | 219/243 |
| 2001/0030192 A1 | 10/2001 | Redmond | |
| 2003/0217531 A1 | 11/2003 | Keen et al. | |
| 2004/0016771 A1 | 1/2004 | Redmond | |

* cited by examiner

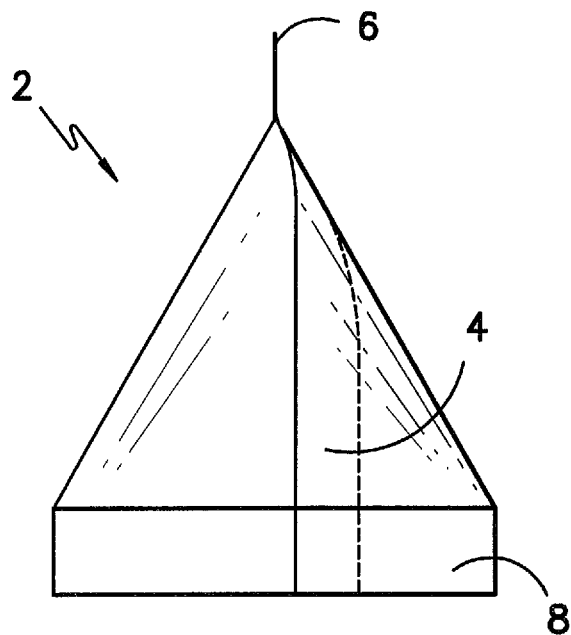
FIG. -1A-
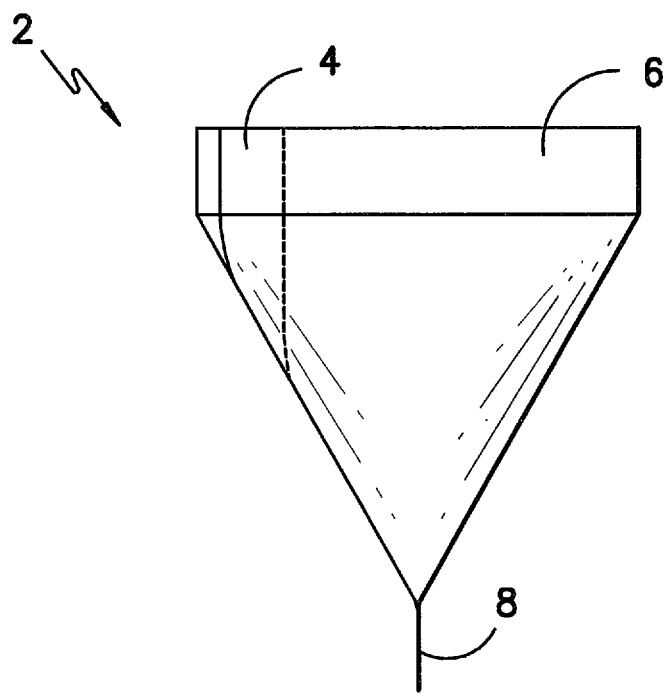
FIG. -1B-

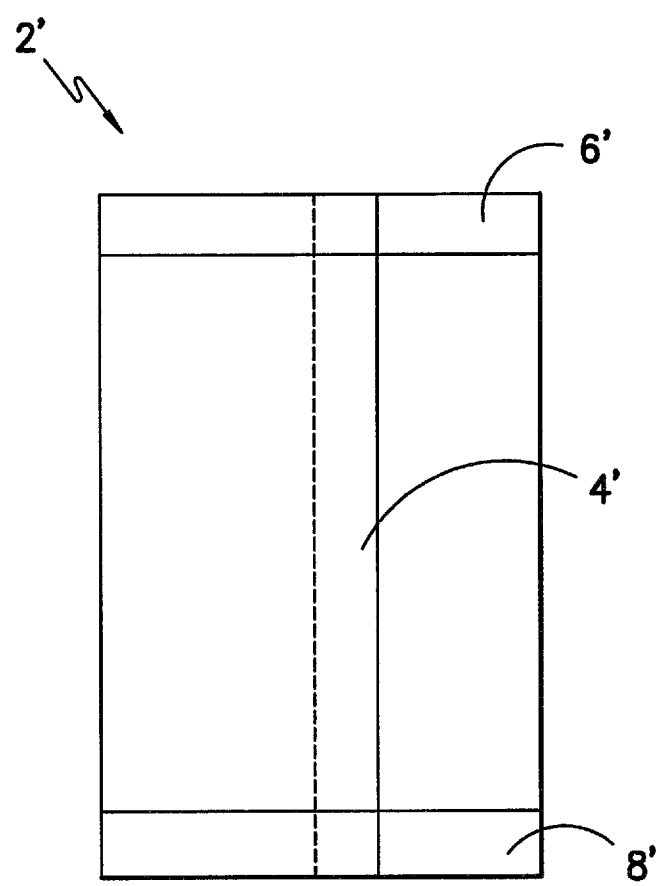
FIG. −1C−

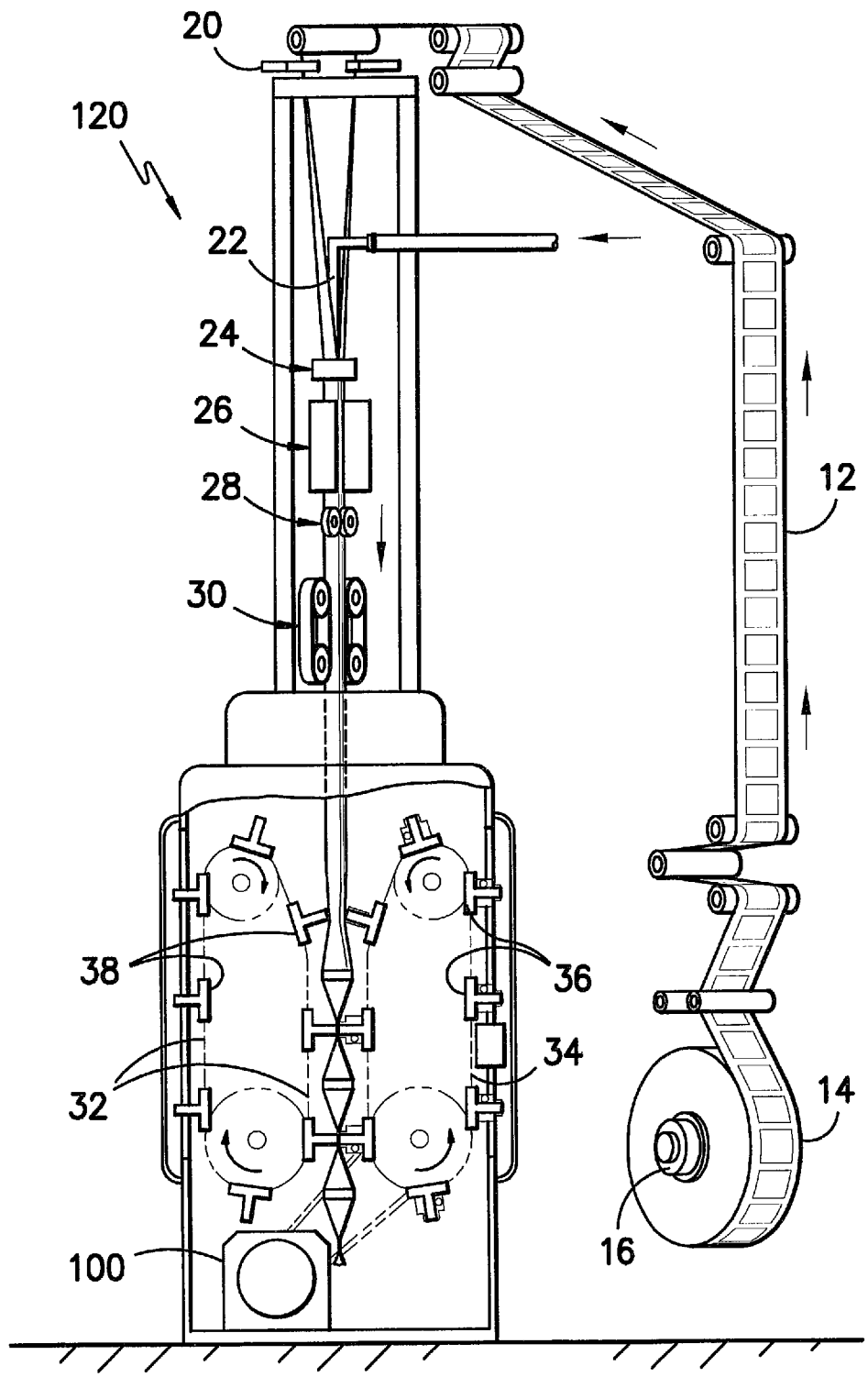
FIG. -2-

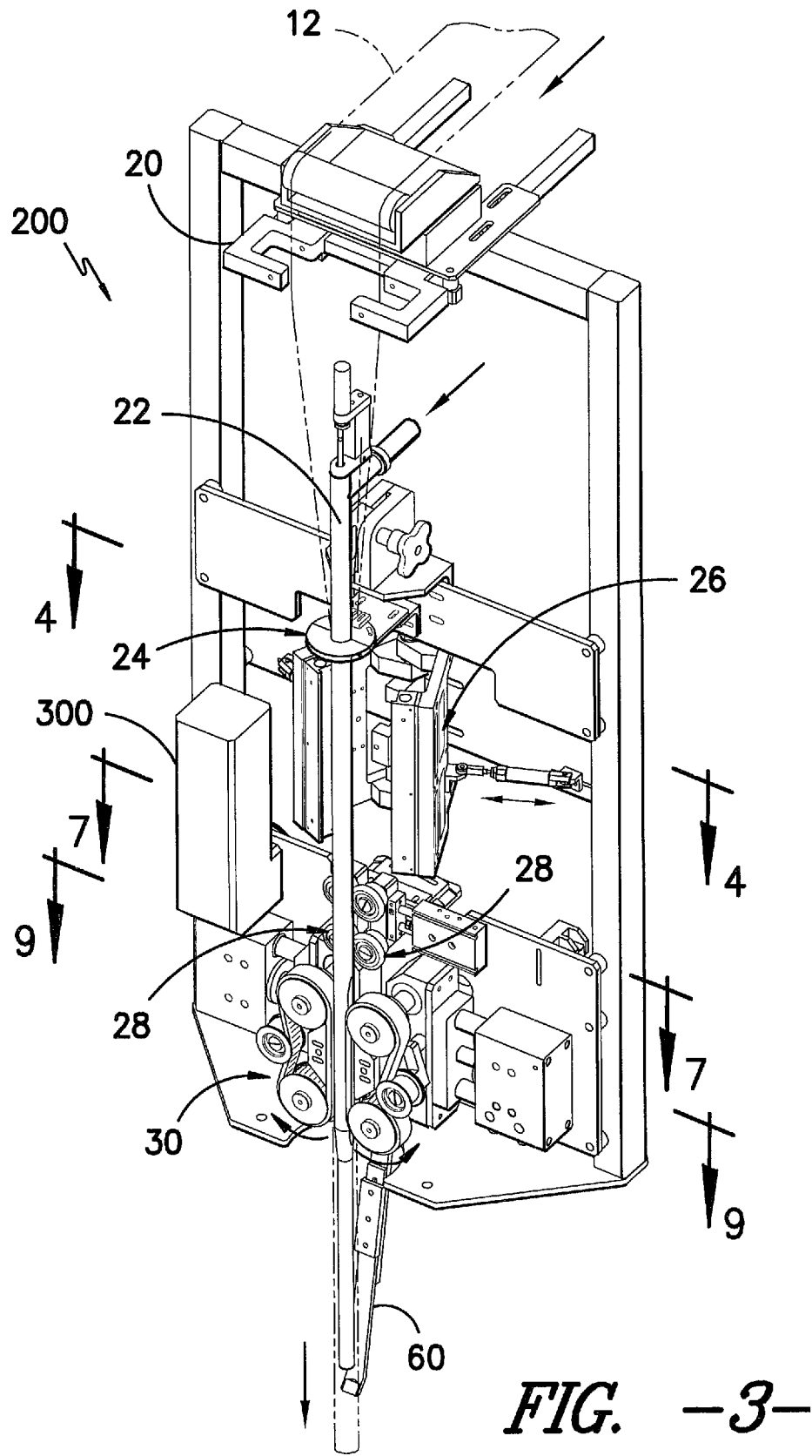
FIG. -3-

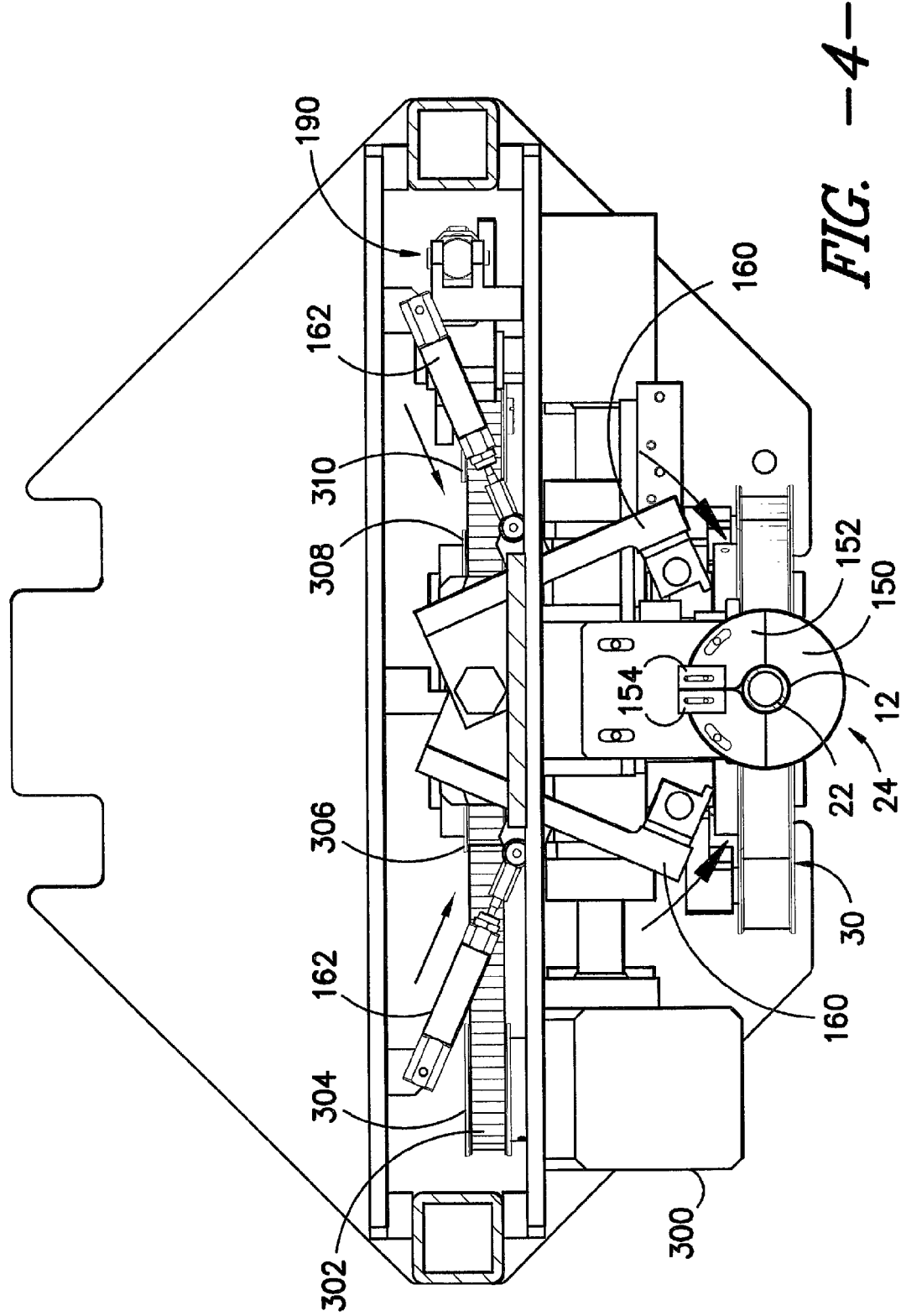
FIG. -4-

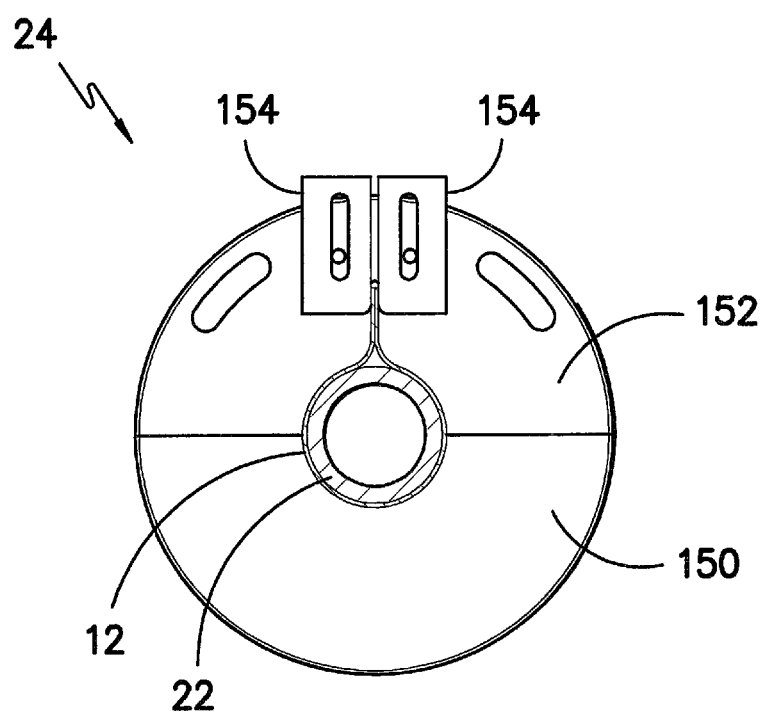
FIG. -5-

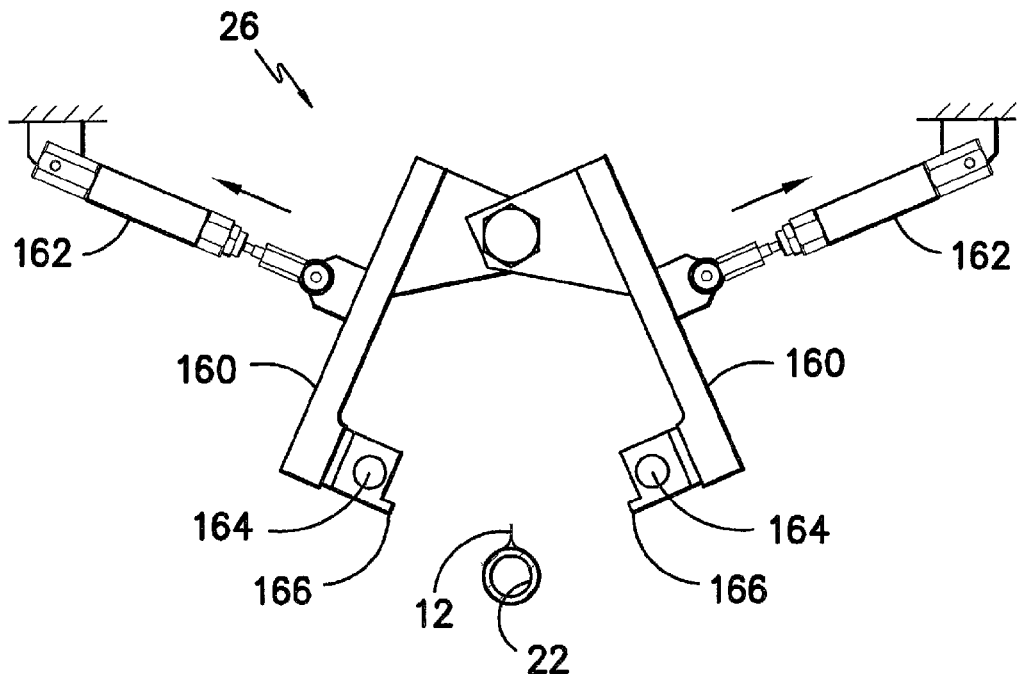
FIG. -6A-
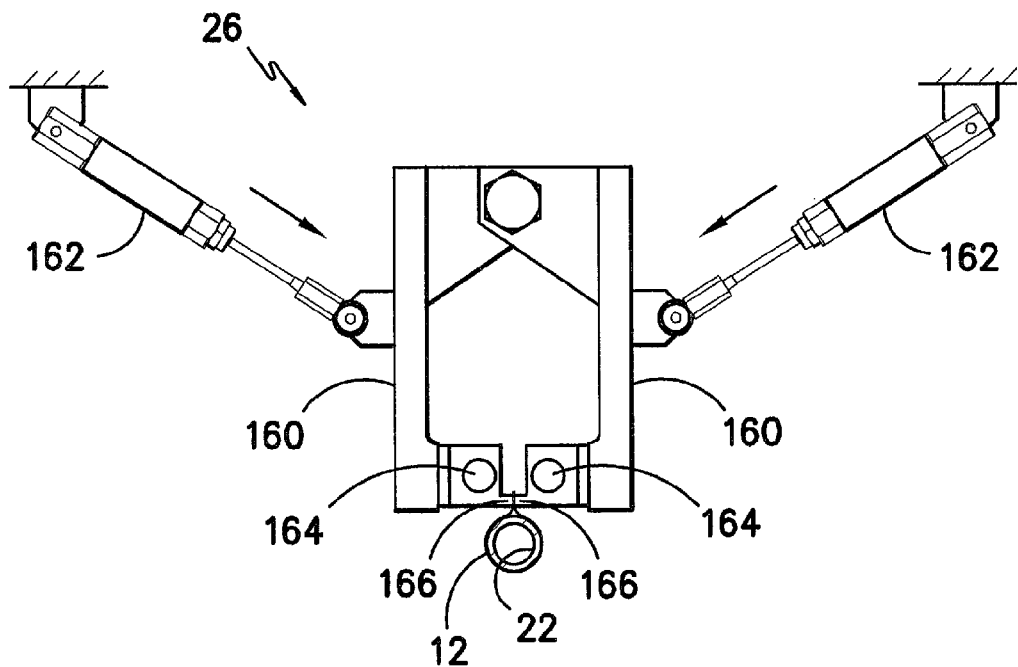
FIG. -6B-

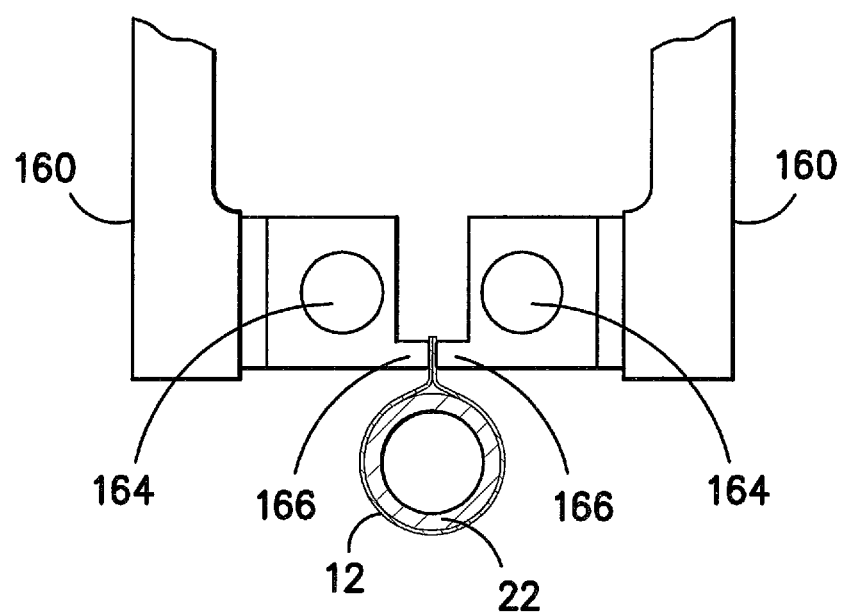
FIG. -6C-

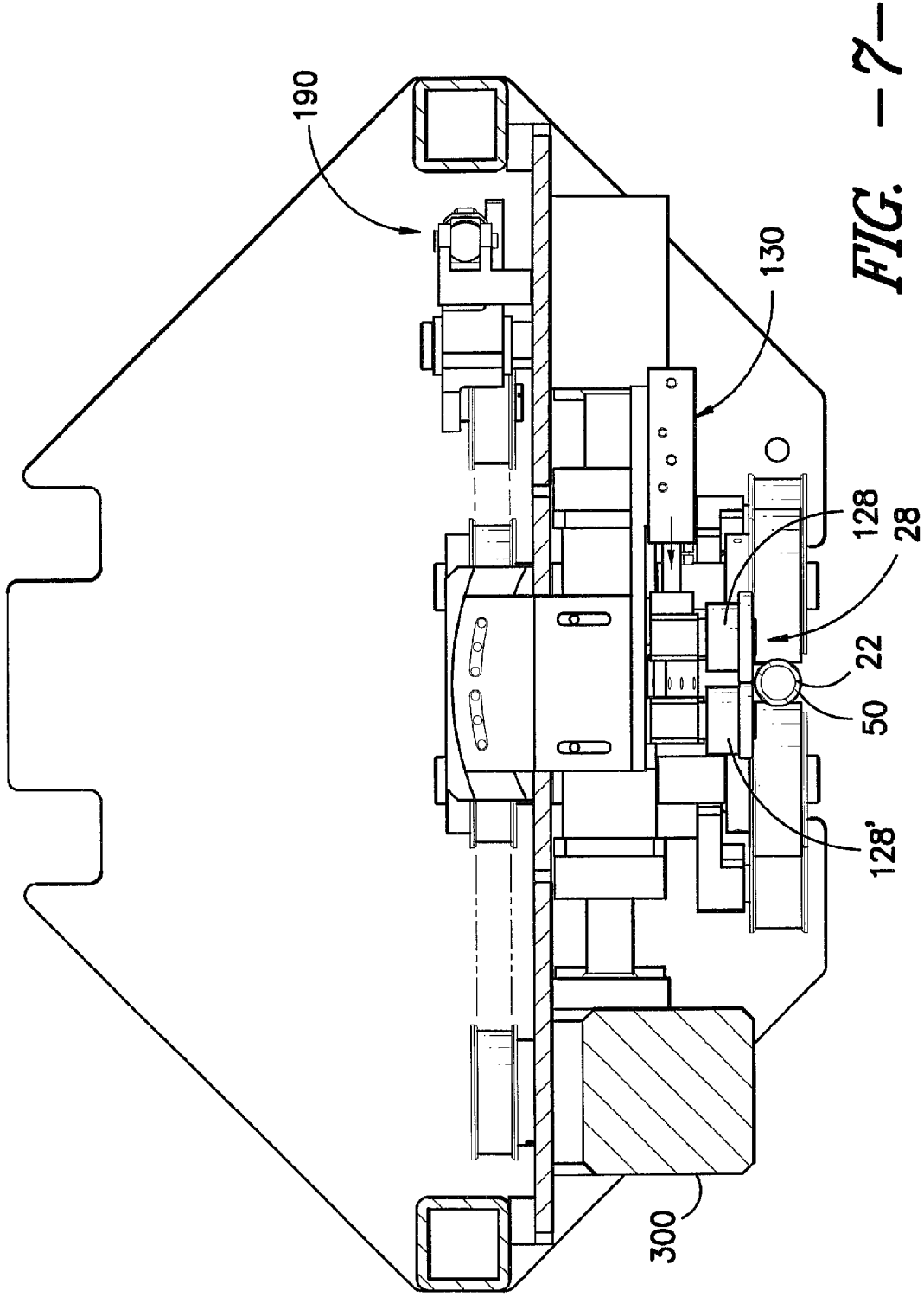

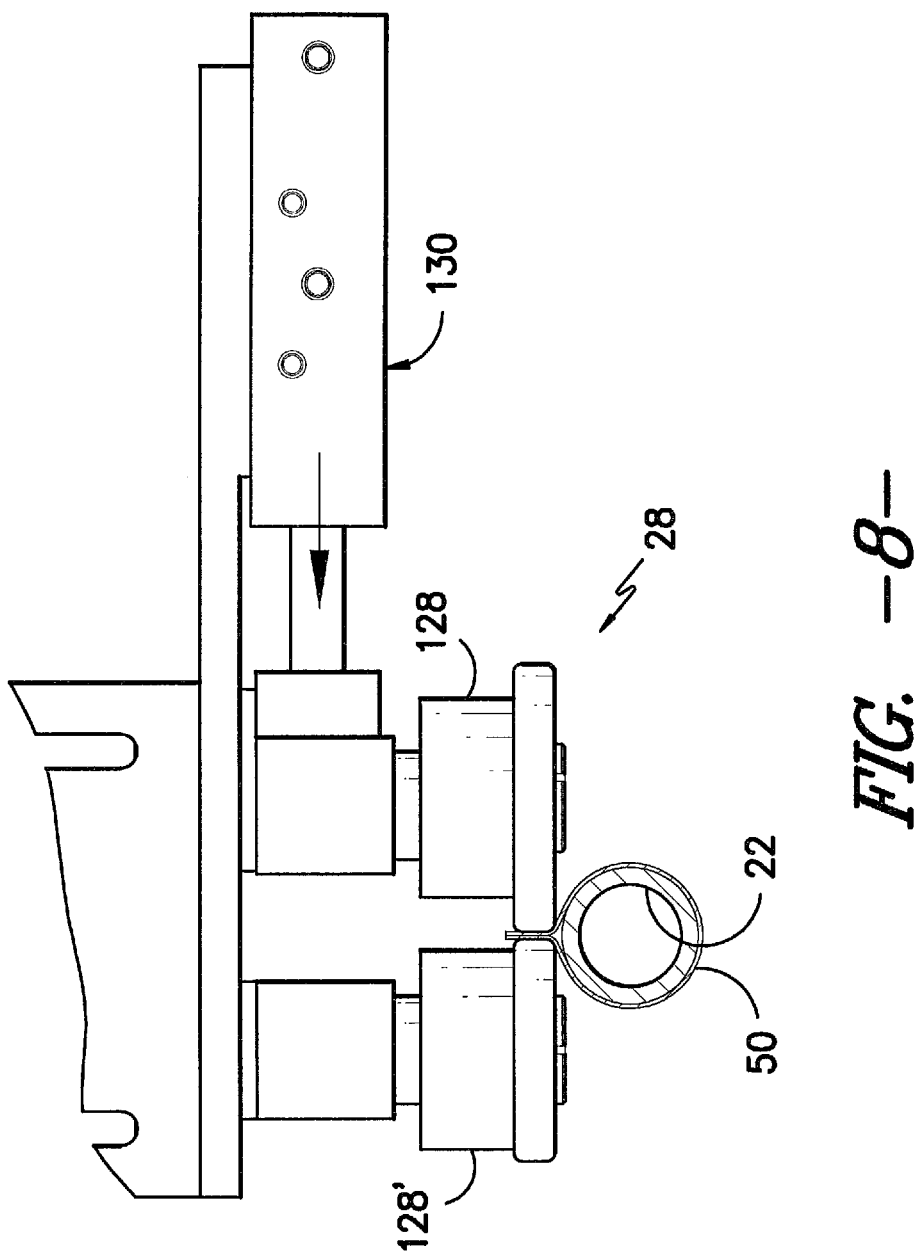

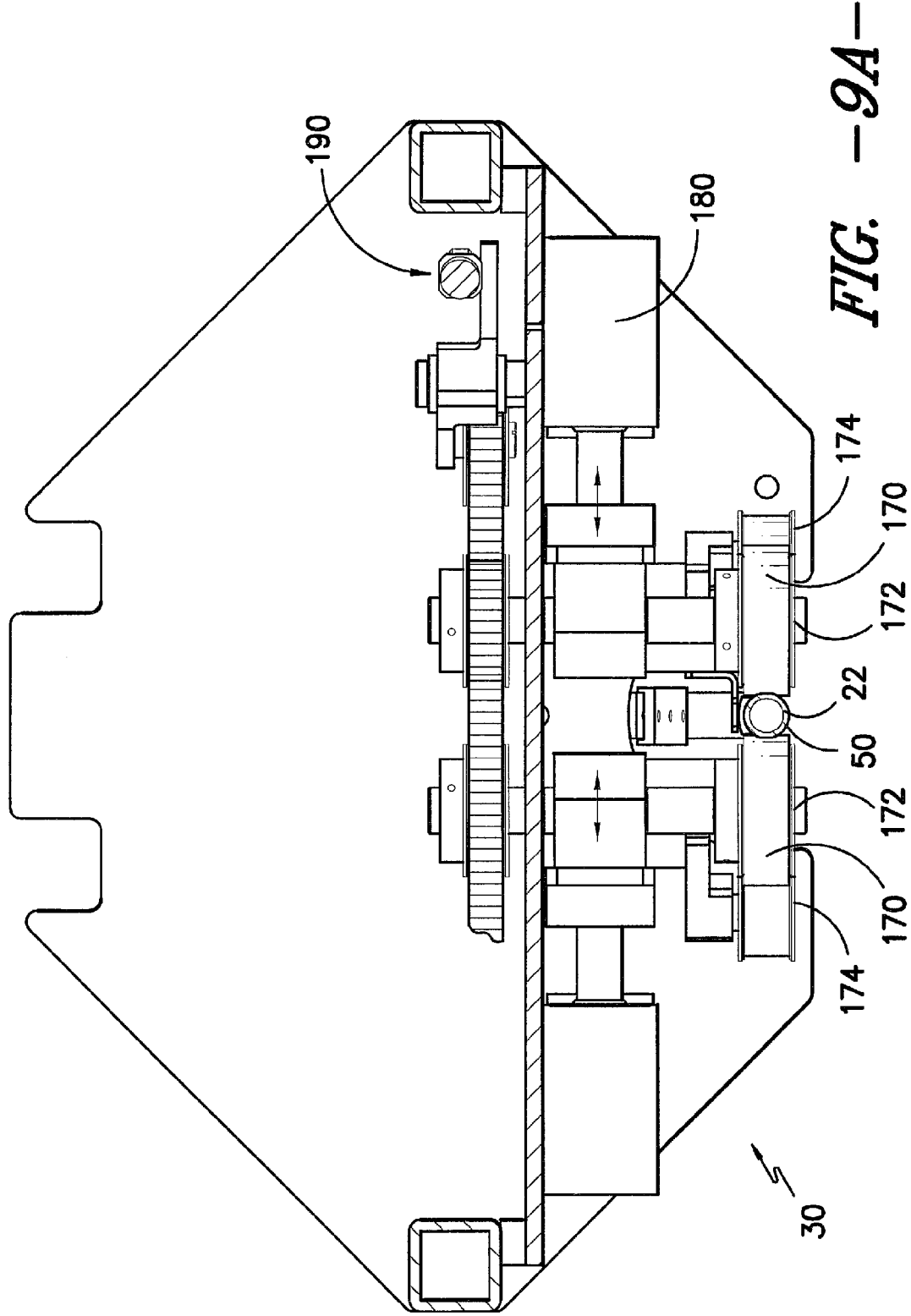
FIG. -9A-

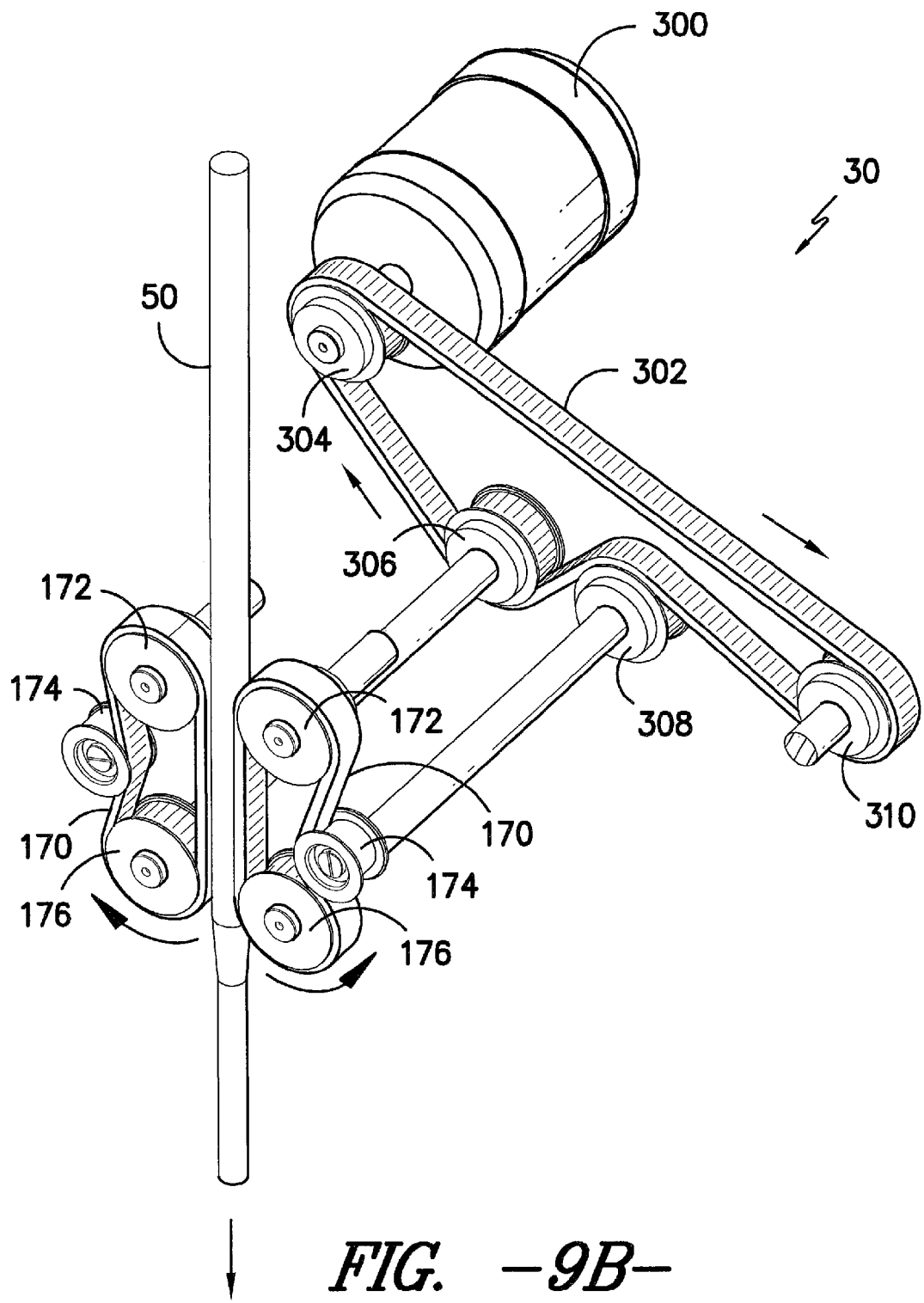
FIG. —9B—

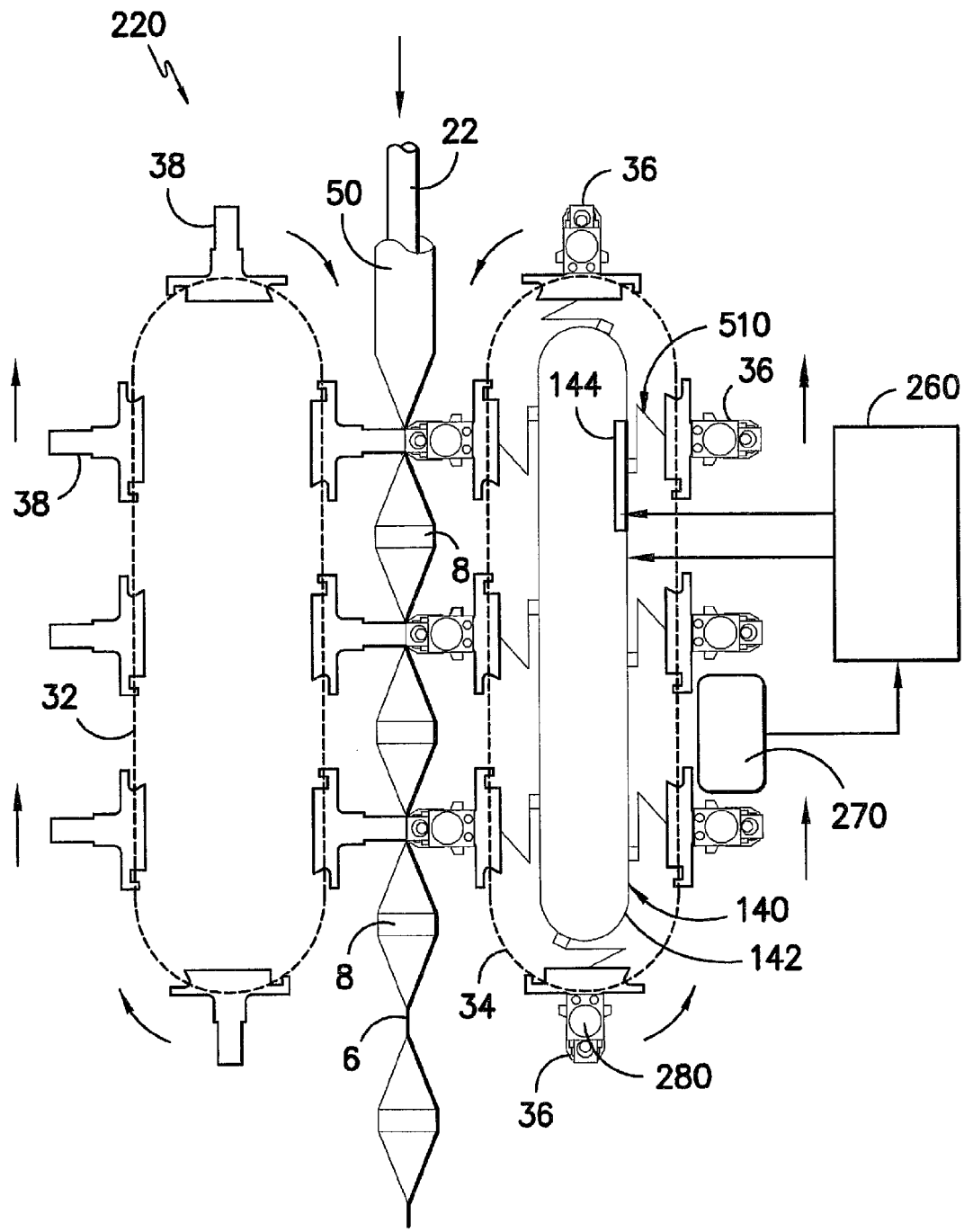
FIG. –10A–

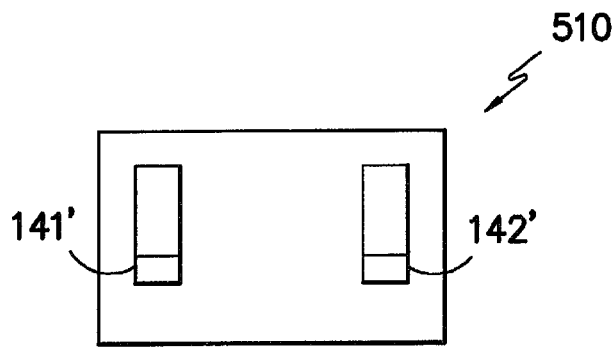
FIG. -10B-
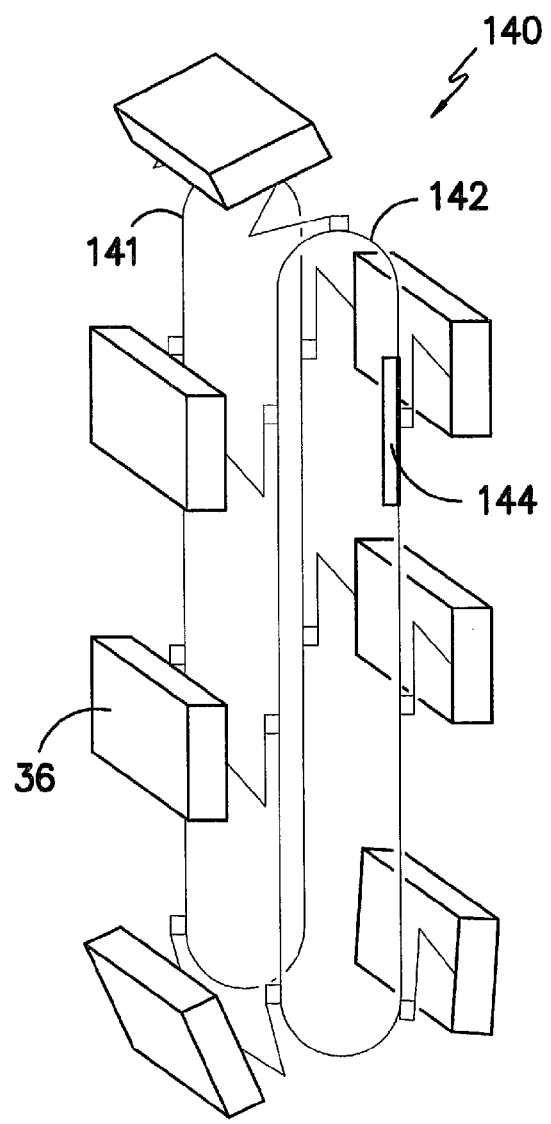
FIG. -10C-

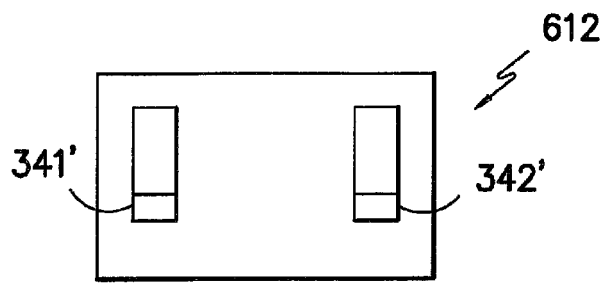
FIG. -10D-
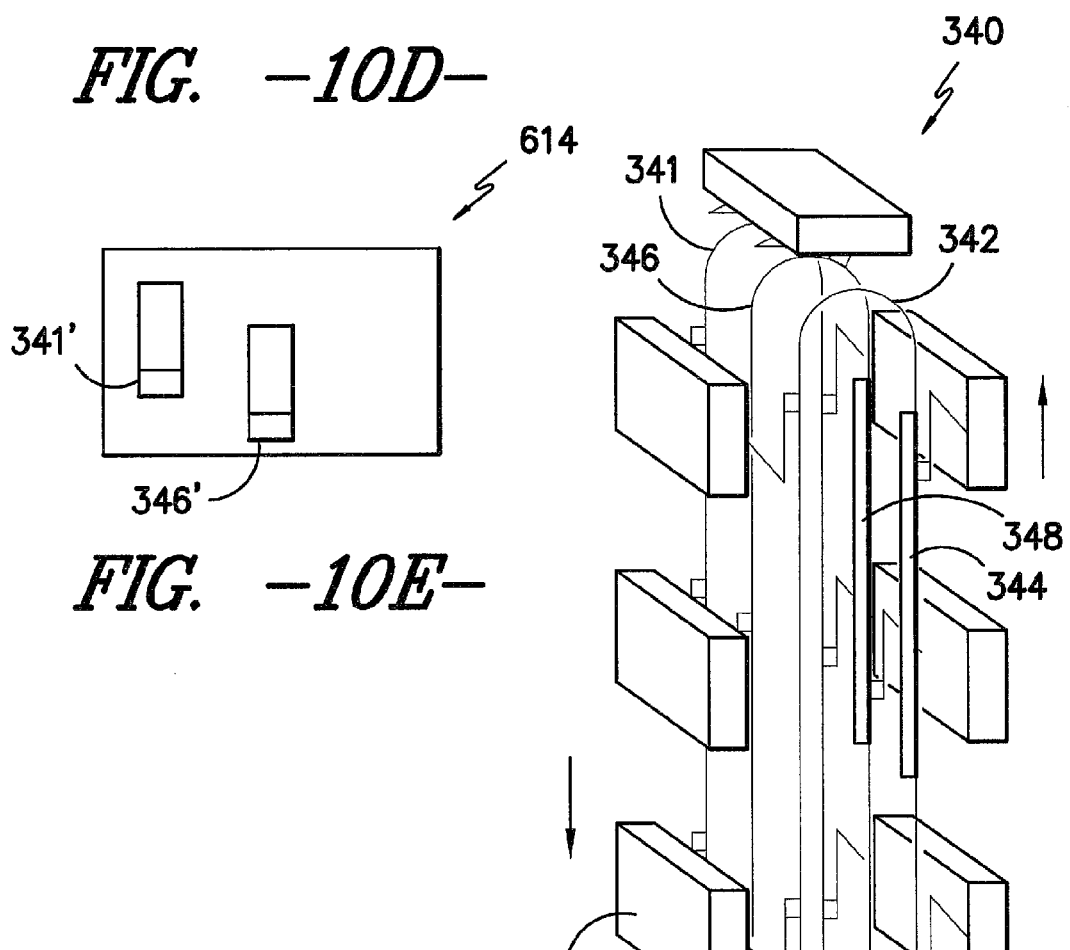
FIG. -10E-
FIG. -10F-

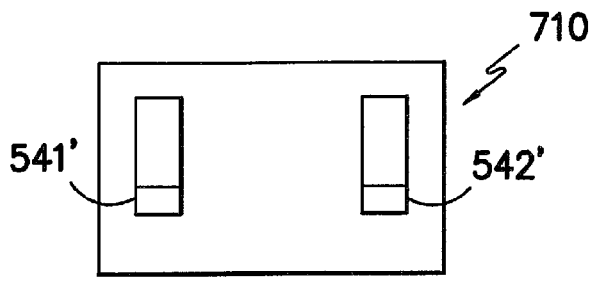
FIG. -10G-
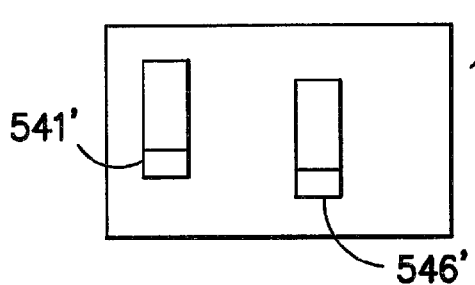
FIG. -10H-
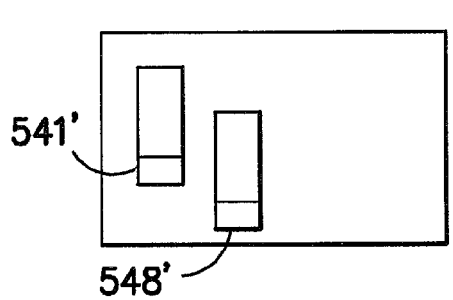
FIG. -10I-
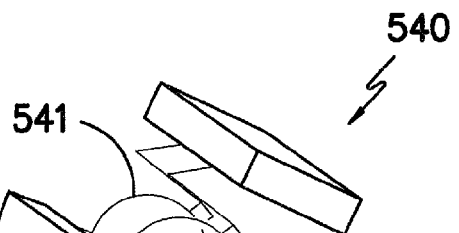
FIG. -10J-

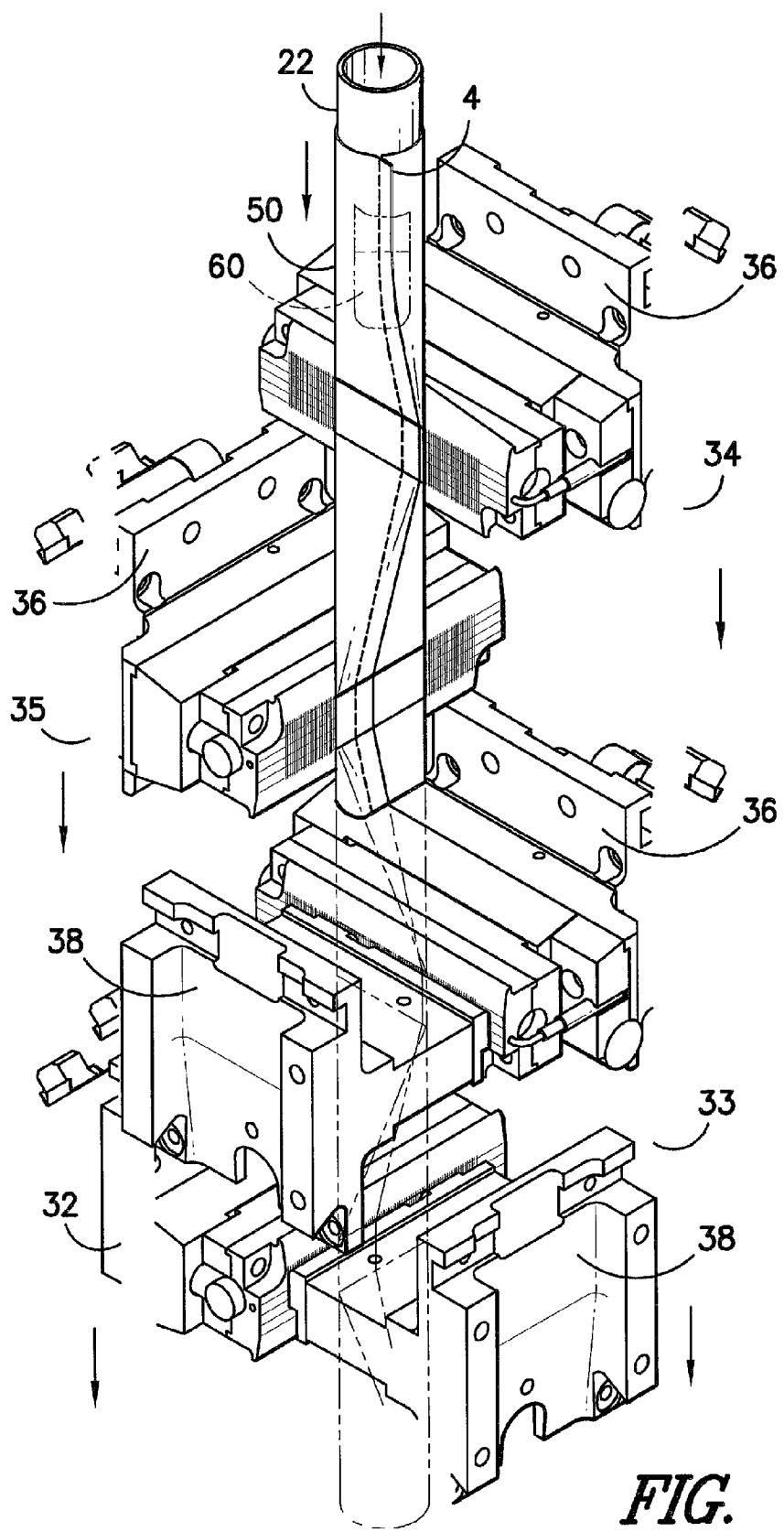
FIG. -11-

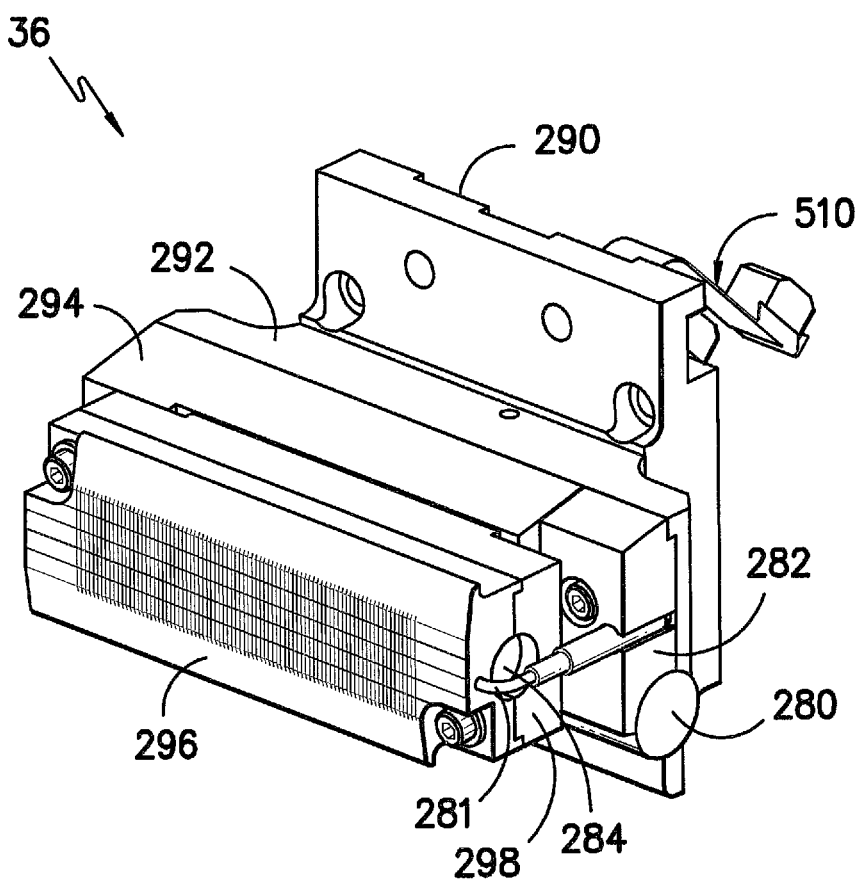
FIG. -12-

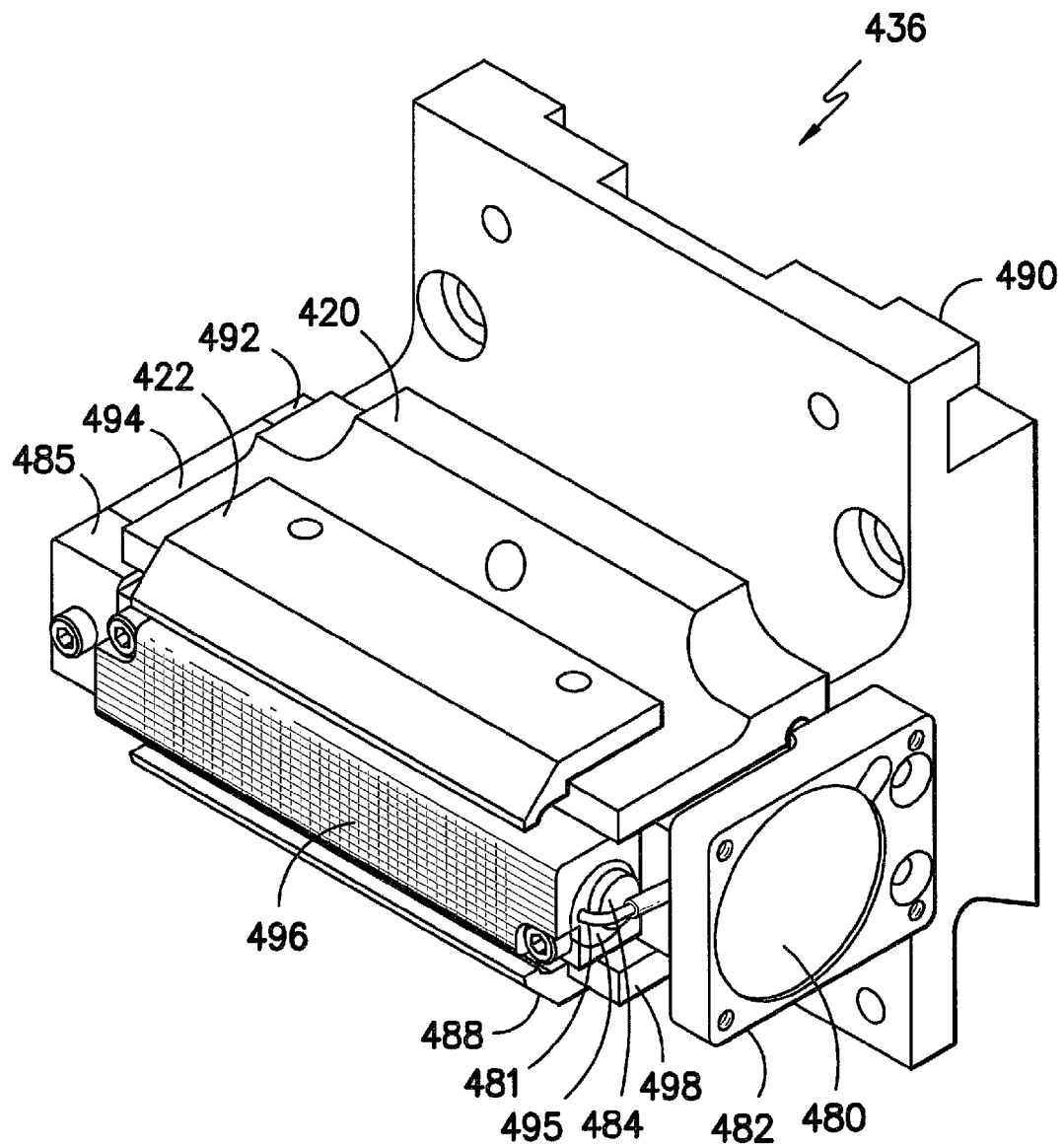
FIG. —13—

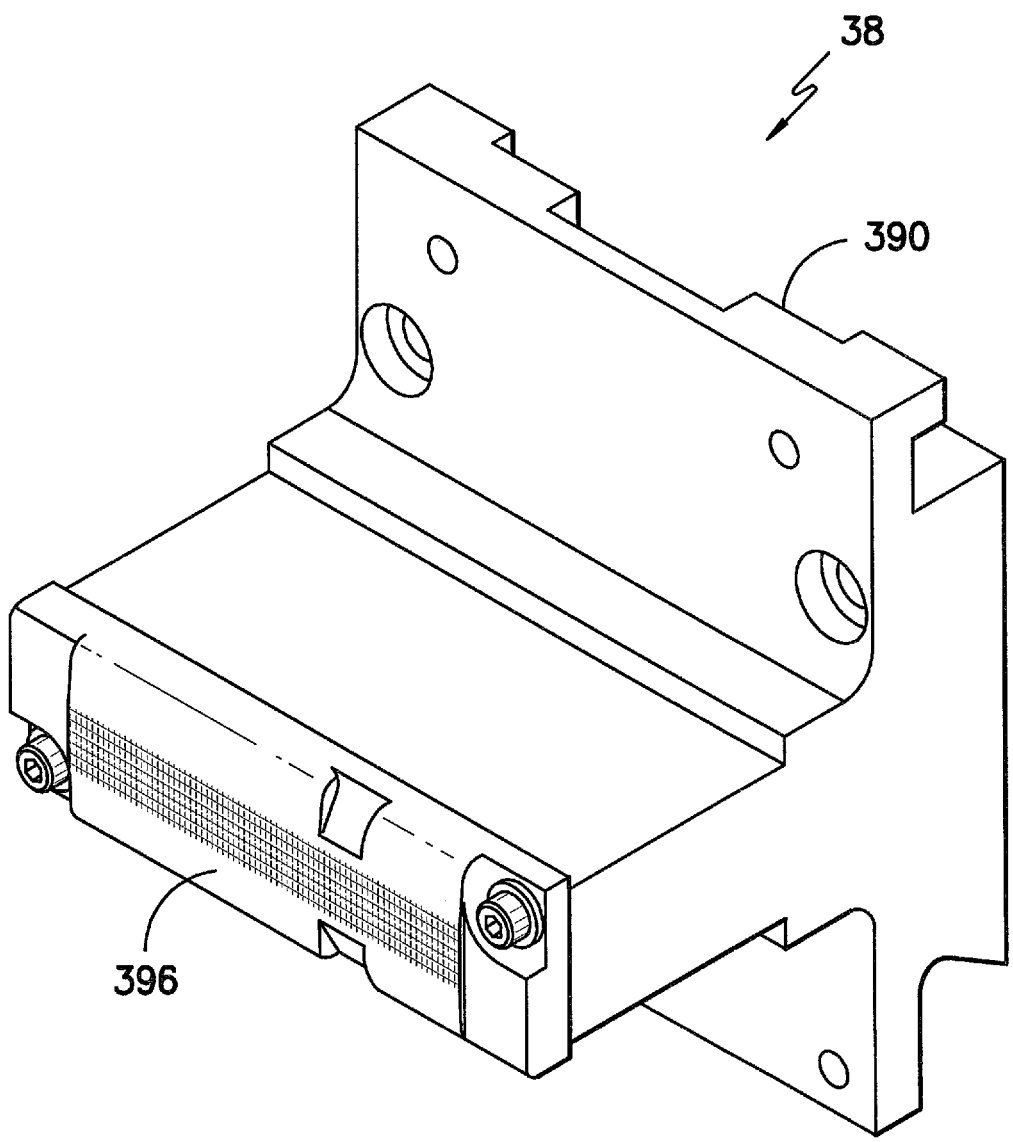
FIG. —14—

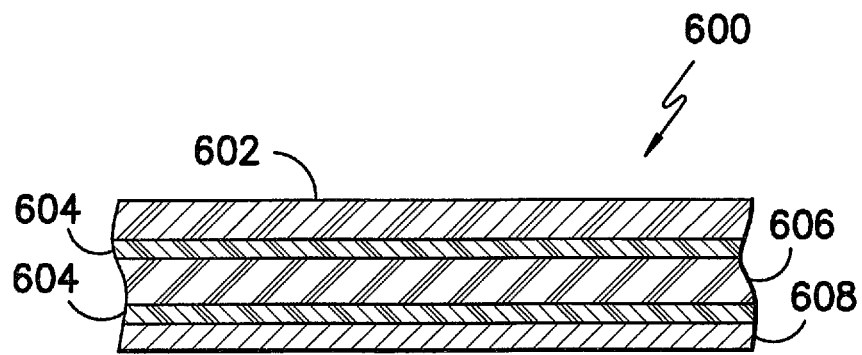
FIG. −15A−
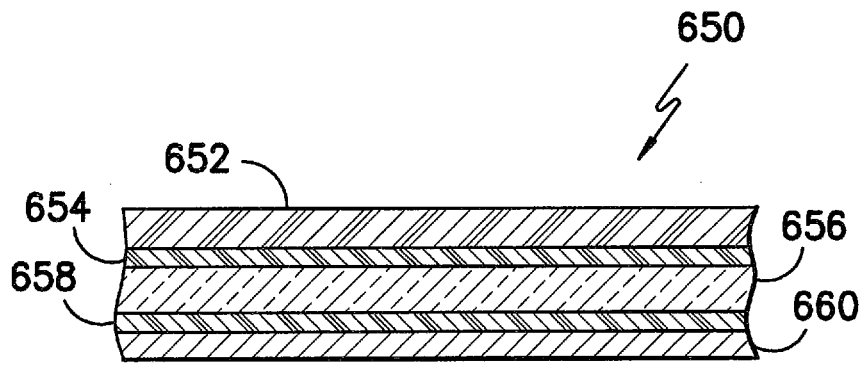
FIG. −15B−
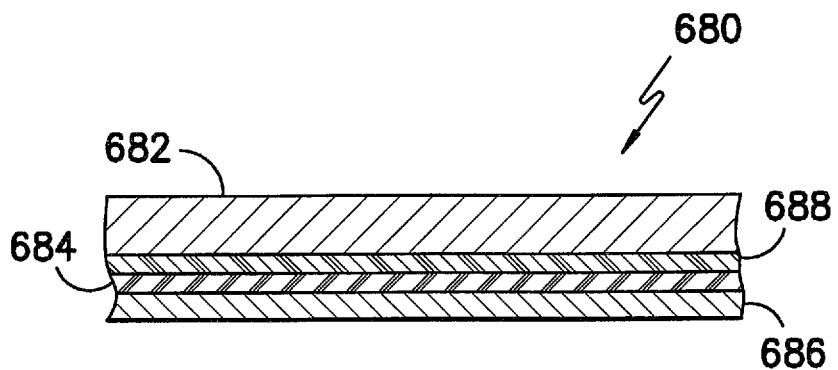
FIG. −15C−

PACKAGING MACHINE AND PACKAGES MADE THEREWITH

CROSS-REFERENCE TO RELATED APPLICATIONS

This application claims priority to, and is a divisional of, co-pending U.S. patent application Ser. No. 11/985,456 entitled "Packaging Machine and Packages Made Therewith," which was filed on Nov. 15, 2007 now abandoned, and is hereby entirely incorporated by reference.

TECHNICAL FIELD

The present disclosure relates to improvements in continuous fill packaging machines and, particularly, to machines that produce liquid-filled packages and to the packages produced thereby. Generally, the packages are non-reclosable, tetrahedral-shaped containers having a central longitudinal seal and opposite transverse seals that are oriented perpendicularly to one another. Described herein are equipment and processes for forming fin-shaped seals in the longitudinal direction, which are useful in situations where an overlapping seal may be inadequate or vulnerable. Also described herein are improvements to the heated jaws that produce the transverse package seals and to the corresponding power supply system for such heated jaws. Such improvements enable the continuous production of liquid-filled containers having strong seals in both the longitudinal and transverse directions.

BACKGROUND

Machines that are designed to produce cushion-shaped, parallelepedic-shaped, or tetrahedral-shaped packages from a continuous roll or flat web of packaging material are well known in the packaging industry. Often, such packages are used to hold single servings of consumable food products. Representative items include liquids such as fruit juice and non-carbonated beverages (which may remain liquid or be subsequently flash-frozen into solids) and semi-solids, such as sour cream or other viscous sauces.

Commonly, such packaging machines are of the "form-fill-seal" variety, in which a continuous flat web of suitable packaging material (e.g., wax- or plastic-coated paper) is formed into a vertically oriented tube-like structure by means of passing the web through one or more ring-like guides or forming collars, with a longitudinal seal formed by adhesively or thermally joining the opposed longitudinal edges of the web, often in overlapping configuration.

Once a tube of packaging material is produced, the product is introduced and it is necessary to form transverse seals to create a string of connected, filled packages. Opposed sets of heated and pressure jaws compress the tube, in spaced intervals, as the tube is moved through the machine. The string of connected packages may then be separated from one another by cutting the sealed tube segments in the region of the transverse seals.

Because the transverse seals are bisected to produce individual packages, it has been found that these transverse seals are most prone to leakage. While such leakage is less problematic when the product is frozen or very viscous (such as is the case with sour cream), the leakage rate is typically unacceptable for liquid products (such as juice or other beverages). Most often, the poor transverse seal is attributable to temperature variation from one heated jaw to another. The reason for this problem in machines of this type is that the heated jaws are constantly moving along an oval or elliptical path, which makes monitoring and adjustment of the jaw temperatures difficult.

The present disclosure addresses this deficiency in currently available equipment by providing a closed-loop electrical system for powering the heated jaws that includes equipment for monitoring the temperature of the jaw faces and for adjusting the power supplied to those jaw faces in real-time. As a result, the temperature differential among the heated jaws is considerably smaller than that of previous heated jaws, which are part of an open-loop control system.

Another issue related to existing packages with an overlapping seal is that one of the cut longitudinal edges of the packaging material is exposed to the food product. When the food products are acidic in nature, such as some juices or ketchup, or when the food products are aqueous and the packaging material includes a wickable layer (e.g., paper), the food products tend to "attack" the exposed cut edge of the packaging material. As a result, the longitudinal seals become susceptible to failure. By incorporating a "fin"-type seal in place of the traditional overlap seal, the cut edges of the packaging material remain on the outside of the formed package, and a more reliable longitudinal seal is formed. Provided herein is a subassembly for forming a fin seal on a continuous-fill packaging machine.

SUMMARY

Provided herein is a liquid-filled, non-reclosable tetrahedral or pillow-shaped packaging container having a longitudinal fin seal and a pair of transverse seals. In the case of tetrahedral packages, the transverse seals are substantially perpendicular to one another. These types of packages may be preferred for many applications, because the surface area-to-volume ratio is better than for pillow-shaped packages (that is, less surface area of packaging material is needed per unit of volume). The packages may be formed of paper, film, or foil, which include a meltable layer on one side. The packages are designed to contain liquid and semi-solid food products, including beverages (such as fruit juice, sweetened beverages, and coffee flavorings); condiments (such as ketchup, mustard, and salad dressing); and viscous semi-solids (such as sour cream or mayonnaise).

Also provided herein is an apparatus for the formation of such fin seals as part of a continuous packaging and filling operation. The apparatus includes a tube-forming subassembly, a seal-heating subassembly, a seal-pressing subassembly, and a tube-conveying subassembly. In the tube-forming subassembly, the stock material is fed such that the meltable layer on one side of the stock material is positioned toward the inside of the device. Then, the longitudinal edges of the stock material are positioned through a slot that holds the respective interior sides against one another, such that the meltable layers are in contact with each other. The area adjacent to the longitudinal edges is then heated by the seal-heating subassembly to melt the meltable layer on the stock material, and the longitudinal fin seal is formed by pressing the longitudinal edges together in the seal-pressing subassembly. The tube-conveying subassembly pulls the formed tube through the apparatus and into the transverse sealing subassembly.

A third aspect of the apparatus of the present disclosure is provided in a closed-loop heated jaw system for real-time monitoring and adjustment of the temperatures of the heated jaws, as they are moving. The heated jaw system includes thermocouples that monitor the temperature of the jaw face; wireless transmitters that transmit the temperature readings to an antenna; an antenna that powers the wireless transmitters, receives the data, and transmits the data to a programmable logic controller; a pair of power rails that provide power to the heated jaws and that include a base level portion and a power-correction portion; and a programmable logic controller that controls the power supplied to the base level portion and the power-correction portion of the power rails. Using this closed-loop system, the temperature variation among the heated jaws is minimized, thereby ensuring consistent formation of strong transverse seals.

The various subassemblies described above and herein provide a continuous-fill packaging machine, particularly useful for liquid food products. The resulting packages have reliable and durable seals in both the longitudinal direction and the transverse direction.

BRIEF DESCRIPTION OF THE DRAWINGS

FIG. 1A is a front view of a tetrahedral package formed in accordance with the teachings herein;

FIG. 1B is another view of the tetrahedral package formed in accordance with the teachings herein;

FIG. 1C is a parallelepedic package having a fin seal, which may be formed in accordance with the teachings herein;

FIG. 2 is a schematic representation of a packaging machine of the present disclosure, which is equipped with a fin seal-forming assembly;

FIG. 3 is an isometric view of the fin seal-forming assembly of the present disclosure;

FIG. 4 is a cross-sectional view of a tube-forming subassembly of the fin seal-forming assembly, as taken along Line 4-4 of FIG. 3;

FIG. 5 is a plan view of the tube-forming ring of FIG. 4;

FIG. 6A is a plan view of a fin seal-heating subassembly, in which the fin seal heater arms are in an open position;

FIG. 6B is a plan view of the fin seal-heating subassembly of FIG. 6A, in which the fin seal heater arms are in a closed position;

FIG. 6C is a close-up plan view of the fin seal heater arms of FIG. 6B, as in contact with a strip-shaped sheet of packaging material;

FIG. 7 is a cross-sectional view of a fin seal-pressing subassembly, as taken along Line 7-7 of FIG. 3;

FIG. 8 is a close-up plan view of the fin seal-pressing subassembly of FIG. 7;

FIG. 9A is a cross-sectional view of a tube-conveying subassembly, as taken along Line 9-9 of FIG. 3;

FIG. 9B is a three-dimensional, isometric view of the tube-conveying subassembly, showing the drive mechanism for the tube-conveying subassembly;

FIG. 10A is a schematic representation of a package-forming subassembly, in which the cooperative relationship between pressure jaws 38 and heated jaws 36 is illustrated and in which a closed-loop power supply subassembly is represented;

FIGS. 10B-10J illustrate the various embodiments of the backs of heated jaws having two or more electrical contacts for use in various embodiments of the closed-loop electrical systems provided herein;

FIG. 10B is a schematic representation of the back 510 of a heated jaw, showing the electrical contacts 141' and 142';

FIG. 10C is an isometric view of a closed-loop, modified electrical system 140 having two power rails 141, 142, which shows the placement of seven heated jaws and their respective electrical contacts, and which further shows a power-correction portion 144 of power rail 142, the power-correction portion having a length that is equal to, or slightly less than, the distance (or "pitch") between adjacent jaws;

FIGS. 10D and 10E are schematic representations of alternate versions 612, 614 of the back of a heated jaw, showing electrical contacts 341', 342', and 346', for use with the electrical system of FIG. 10F;

FIG. 10F is an isometric view of a closed-loop, modified electrical system 340 having three power rails 341, 342, and 346, which shows the positioning of eight heated jaws and their respective electrical contacts, and which further shows a pair of power-correction portions 344, 348, the power-correction portions having a length that is twice, or slightly less than twice, the pitch between adjacent jaws;

FIGS. 10G, 10H, and 10I are schematic representations of alternate versions 710, 712, 714 of the back of a heated jaw, for use with the electrical system of FIG. 10J;

FIG. 10J is an isometric view of a closed-loop, modified electrical system 540 having four power rails 541, 542, 546, and 548, which shows the positioning of nine heated jaws and their respective electrical contacts, and which further shows three power-correction portions 543, 547, and 549, the power-correction portions having a length that is three times, or slightly less than three times, the pitch between adjacent jaws;

FIG. 11 is an isometric view illustrating the formation of a chain of tetrahedral packages, showing the cooperative relationship of heated jaws and pressure jaws;

FIG. 12 is an isometric view of a first heated jaw subassembly of the present disclosure;

FIG. 13 is an isometric view of a second heated jaw subassembly of the present disclosure;

FIG. 14 is an isometric view of a pressure jaw subassembly, which functions in cooperation with the heated jaw subassembly of FIG. 12 or FIG. 13;

FIG. 15A is a cross-sectional view of a first type of substrate useful for the packaging containers described herein;

FIG. 15B is a cross-sectional view of a second type of substrate useful for the packaging containers described herein; and FIG. 15C is a cross-sectional view of a third type of substrate useful for the packaging containers described herein.

DETAILED DESCRIPTION

Filled tetrahedron-shaped containers may be formed from a web of sheet material, such as paper stock, foil, or film, each of which has a meltable coating on at least one side. Such tetrahedral containers 2 are shown in FIG. 1A and FIG. 1B, which show the relative position of a longitudinal seal 4, a first transverse seal 6, and a second transverse seal 8. The first transverse seal 6 and the second transverse seal 8 are positioned perpendicularly to one another. Typically, in production, longitudinal seal 4 is positioned on the back of tetrahedral container 2. As shown, longitudinal seal 4 has a fin seal configuration (that is, the interior sides of the stock material abut, and are sealed to, one another). Alternately, longitudinal seal 4 may be an overlap seal, in which the stock material is lapped over itself (that is, an interior side of the stock material is secured to an exterior side of the stock material). The longitudinal seal 4 is off-set from the outermost edge of the transverse seal 6, as shown in FIG. 1B, to ensure that both the longitudinal and transverse seals are robust. This is accomplished by having the longitudinal sealing portion of the packaging machine be off-set (preferably at a 45-degree angle, although other degrees of off-set may be used) to the transverse sealing portion of the packaging machine.

Tetrahedron-shaped containers are preferred for many applications, because of their lower surface-area-to-volume ratio, and, therefore, they will be referred to most often in this disclosure. However, it should be understood that cushion-shaped containers 2' (as shown in FIG. 1C) may also be formed according to the teachings herein by adjusting the position of sealing clamp jaws and pressure jaws, as will be readily apparent to those of skill in the art. Similarly to tetrahedral-shaped containers 2, such cushion-shaped containers 2' have a longitudinal seam 4' on one side and transverse seams 6' and 8' at opposite ends.

As shown in FIG. 2, the stock material 12 is conveyed through a longitudinal sealing portion of the packaging machine 120 and then through a transverse sealing portion of the packaging machine 120. The process of forming tetrahedron-shaped filled containers 2 begins with a roll 14 of preprinted flat package stock 12. The stock material 12 may be any suitable material, such as paper, foil, or film, which includes a meltable coating on at least one side. Representative configurations of multi-layered stock materials are shown in FIGS. 15A-15C, which will be discussed further herein.

The speed and tension of sheet material roll 14 is controlled by a brake mechanism 16. The stock material 12 is supported on a suitable support member (not shown) and is delivered upwardly over a plurality of guide rolls supported by frame members secured to the machine 120. The stock material 12 is delivered downwardly from the upper portion of the machine 120 through a web guide 20, which ensures that the stock material 12 is correctly positioned in a horizontal, or transverse, direction for entry into the machine. One representative web guide assembly 20 is sold by Fife Corporation of Oklahoma City, Okla., although other manufacturers sell devices that function similarly.

In the longitudinal sealing portion of the packaging machine, the stock material 12 is conveyed through a tube-forming subassembly 24, a seal-heating subassembly 26, and a seal-pressing subassembly 28, with the conveyance of the stock material being accomplished by a tube-conveying subassembly 30. The resulting tube of stock material includes a longitudinal seal, which is preferably of the "fin"-seal type.

Once the tube of stock material is formed, the tube is conveyed into the transverse sealing portion of the packaging machine 130, which is operated by a motor 100. In the transverse sealing portion of the machine, transverse seals are made by the interaction of a heated jaw 36 (carried on a pair of chains 34) with a corresponding pressure jaw 38 (on a pair of chains 32). A second set of heated jaws and pressure jaws is oriented perpendicularly to the set shown to form transverse seals in a perpendicular direction to those formed by the first set of heated and pressure jaws. The package contents are conveyed into the packages in a continuous-fill operation through fill pipe 22, which extends through the longitudinal sealing portion of the packaging machine to an area just above where the first transverse seal is formed.

Motor 100 is connected, via a drive belt, to one of the chains 34 conveying the heated jaws 36. The remaining chains (including chains 32 and the perpendicularly oriented chains not shown) are connected to one another by a plurality of interacting gears (not shown).

The string of filled, connected packages is then either conveyed to a cutting mechanism, which separates the individual packages by bisecting the transverse seals, or gathered into a bin for transportation to an off-line cutting mechanism. Preferably, for expediency, the cutting mechanism is in-line with the filling-and-sealing operation.

The first station is a tube-forming subassembly 24 (shown in detail in FIGS. 4 and 5) that bends the material 12, such that the longitudinal edges are aligned with one another with the interior sides of the sheet material abutting each other. This configuration forms a "fin" shape around a fill pipe 22 (as shown in FIG. 5), which acts as a mandrel around which the tube of stock material 12 is formed. (Alternately, a separate forming mandrel may be positioned over the fill pipe 22, if desired.) The fill pipe 22 extends within the tube 50 of stock material and that extends to a point above the region where the transverse seals are formed. From the tube-forming subassembly 24, the stock material 12 passes through a fin seal-heating subassembly 26 (shown in greater detail in FIGS. 6A-6C), where the thermoplastic coating on the stock material is melted so that a bond is formed between the adjacent, abutting edges of the stock material that make the fin.

After being heated by the seal-heating subassembly 26, the longitudinal edges of the stock material are joined. The sealed stock material is then conveyed through a seal-pressing subassembly 28 (shown in greater detail in FIGS. 7 and 8) that applies pressure to the fin seal 4 to further secure the seal, resulting in the formation of a closed cylinder 50 (i.e., a tube). Because the tube 50 is formed around the fill pipe 22, it should be evident that the longitudinal seal 4 is formed when the tube 50 is empty and the stock material is dry (that is, above the level of the product).

The tube-conveying mechanism 30 (shown in cross-section in FIG. 9) pulls the stock material through the longitudinal sealing portion 200 of the packaging machine 120. As the tube 50 of sheet material is conveyed from the longitudinal sealing portion 200 of the packaging machine 120 to the transverse sealing portion of the packaging machine, the tube 50 is brought into contact with a fin-folding guide 60, which pushes the longitudinal fin seal 4 against the tube 50. The fin-folding guide 60 is made of an angularly disposed strip of steel, having a bend at the distal end thereof for contacting the fin seal. The longitudinal sealing portion 200 of the packaging machine is operated by a servo motor 300, shown in FIG. 3. Each of these subassemblies will be discussed in more detail as follows, with respect to their respective Figures.

The stock material tube 50 is conveyed into the transverse sealing portion of the packaging machine 120. The transverse sealing portion of the machine 120 is operated by a motor 100, which is directly connected, via a belt, to one of the chains 34, which, in turn, is connected to the other pairs of chains by a plurality of gears (not shown).

To form such transverse seals 6, 8, as shown in FIGS. 1A and 1B, opposed sets of heated jaws 36 and pressure jaws 38 are used. Each transverse seal is formed by a heated jaw 36 (shown in more detail in FIG. 12 and, in an alternate form, in FIG. 13) that acts in cooperation with an unheated pressure jaw (shown in more detail in FIG. 14). For convenience, the heated jaw will be identified throughout this description as heated jaw 36; however, it is to be understood that heated jaw 436 functions in a similar way and may be used instead of heated jaw 36, as needs dictate. The heated jaws 36 melt the coating on the interior of the stock material 12, while the pressure jaws 38 simultaneously push the stock material 12 against itself to form each transverse seal.

To this end, two sets of opposed, endless chains carrying heated jaws 36 and corresponding pressure jaws 38 at fixed locations along the chains are continuously and uniformly rotated by gears (not shown) driven by motor 100. One opposed set of endless chains is represented by reference numbers 32, 34, while the second opposed set of chains is axially displaced perpendicularly to the first set of chains (depicted as chains 33, 35 in FIG. 11). The second set of chains is positioned perpendicularly to the plane of the machine shown in FIG. 2 and, as such, is not visible in this view. There are four chains per set, two chains on which the heated jaws are carried and two chains on which the opposing pressure jaws are carried. For ease of illustration, not all chains are shown in this Figure.

Heated jaws 36, mounted on the first set of chains 32, push against corresponding pressure jaws 38 and, in the action of pushing against one another, the jaws 36, 38 push the food product (e.g., the liquid contents) from the area where the transverse seal 8 is to be made. The jaws 36, 38 form a transverse seal below of the level of product in tube 50 and simultaneously advance tube 50, via a pulling action, downwardly through the machine 120 in a continuous motion. In the production of tetrahedral packages, heated jaws 36 on each set of chains are spaced two package lengths from one another. The heated jaws on the first set of chains 34 are located between, and perpendicularly displaced from, the heated jaws on the second set of chains 35, so that the formation of a second seal is one package length away from the first seal.

Due to the relative staggered, or interleaved, positioning of the jaws on the first and second sets of chains (as shown in FIG. 11), a first transverse seal will be made by jaws carried on the first set of chains, with a second transverse seal being made by jaws carried on the second set of chains. It can be seen that the continuously moving heated jaws 36 will form a first seal in a region already occupied by the product, while the product is being supplied from the fill pipe 22. The movement of the driven chains advances the tube 50 downwardly through the machine, where a perpendicularly-spaced pair of jaws forms a second transverse seal (also in a region occupied by the product).

The result is a continuous chain of packages that is conveyed to a cutting means (not shown), wherein each of the transverse seals is severed along its length to form individual tetrahedron-shaped packages. The present process creates a string of linked packages that are subsequently cut into individual units through the middle of the transverse seal. For this reason, it is desirable to make the transverse seal as robust as possible.

FIG. 4 shows a cross-section of the tube-forming subassembly 24, as taken along line 4-4 of FIG. 3. The tube-forming subassembly 24 may be seen in larger scale in FIG. 9B. The tube-forming subassembly 24 includes a forming ring with an aperture in the center thereof, in which the fill pipe 22 is centered. The tube-forming subassembly 24 also includes a first forming ring panel 150, a second forming ring panel 152, and a pair of adjustable fin spacing guides 154. The second forming ring panel 152 includes a machined slot in which the longitudinal edges of the sheet material 12 are positioned to facilitate production of the longitudinal fin seal. The forming ring panels 150, 152 are bolted together (bolts not shown), so that one panel may be easily removed to allow for the removal and cleaning of the fill pipe 22. The tube-forming subassembly 24 may have apertures of different sizes to accommodate fill pipes of different sizes (and, consequently, to produce packages of different sizes). The forming ring panels 150, 152 are preferably made of stainless steel, but may be made of other durable, thermally stable material instead.

FIG. 4 also shows motor 300, which drives a plurality of threaded pulleys 304, 306, 308, which are connected to an idler roll 310. The pulleys are connected by a belt 302. A pivoting pneumatic cylinder 190 permits adjustment of the tension on the belt 302 by permitting the movement of the idler roll 310. Pulley 304 is connected to motor 300, via a drive shaft. Pulley 306 is connected, via a shaft, to a first tube-conveying assembly 30, and, likewise, pulley 308 is connected, via another shaft, to a second tube-conveying assembly 30. Idler roll 310 acts as a belt tensioner and is connected to the frame of the packaging machine.

In the center of FIG. 4 is shown the longitudinal seal-heating subassembly, which has a pair of heater arms 160. Heater arms 160 are opened and closed via pneumatic cylinders 162. Such operation will be described in greater detail, in reference to FIGS. 6A-6C.

FIG. 5 illustrates tube-forming subassembly 24 and the positioning of the sheet material 12 within the machined slot formed in forming ring panel 152. The space between the fill pipe 22 and the aperture in forming ring panels 150, 152 is very small, so that the sheet material 12 is held securely in position for production of the longitudinal seal. Slots of different dimensions may be used to create fin seals of different size.

FIGS. 6A, 6B, and 6C show the operation of the longitudinal seal-heating subassembly 26. The longitudinal seal-heating subassembly 26 includes a pair of heater arms 160 that are opened (as in FIG. 6A) and closed (as in FIGS. 6B and 6C) by pneumatic cylinders 162. The heater arms 160 are pivotally connected to one another. Each heater arm 160 includes a heater element 164 that provides heat to a heater arm face 166. In FIGS. 6A, 6B, and 6C, the forming ring panels 150, 152 have been omitted to show only the feed pipe 22 and the stock material 12. FIG. 6A illustrates the open position of the heater arms 160. In FIGS. 6B and 6C, the faces 166 of the heater arms 164 are in contact with the stock material 12, causing the interior coating of the stock material to melt, or soften, in order to form the longitudinal seal.

Since the filling of the packages is a continuous process, the formation of the longitudinal seal is also a continuous process. The forming of the longitudinal seal 4 occurs while the stock material 12 is dry (that is, before introduction of the package contents), whereas the formation of the transverse seals 6, 8, as will be discussed herein, occurs when the stock material 12 is wet (that is, the tube 50 of stock material is filled with the package contents).

FIGS. 7 and 8 are cross-sectional views of the seal-pressing subassembly 28. The seal-pressing subassembly 28 includes a pair of pressure rollers 128, 128' and a pneumatic pressure roller cylinder 130, which moves pressure roller 128 from an open position to a closed position. Alternately, the pressure rollers 128, 128' may be spring-activated. The closed position is illustrated in further detail in FIG. 8, which shows the pressure rollers 128, 128' converging on the sheet material and forming the longitudinal seal that produces tube 50. Although one set of pressure rollers 128, 128' is shown, two sets may instead be used. The pressure rollers 128, 128' may be made entirely of steel or may have a steel shaft with a urethane-coated flange.

FIG. 9A is a cross-sectional view of a portion of the tube-conveying subassembly 30. The tube-conveying subassembly 30 includes a pair of pulleys, which are indicated on either side of fill pipe 22 as pulleys 172 (pulleys 176 are not shown in this view). A stationary flanged guide 174 is positioned between the pulleys 172, 176. A rubber belt 170 is wrapped around the pulleys 172, 176 and the guides 174 on each side of the packaging tube 50. The pulleys 172, 176 are positioned by the action of pneumatic cylinders 180, in which the engaged position of the pulleys 172, 176 is at the end of the stroke of the pneumatic cylinders 180.

The mechanics of the tube-conveying subassembly 30 are better shown in FIG. 9B. A motor 300 is connected to a belt 302, which is threaded around pulleys 306, 308 and an idler roll 310. The idler roll 310 may be positioned by an air cylinder 190. Pulley 306 is attached, via a first shaft, to a first pulley 176, and a pulley 308 is attached, via a second shaft, to a second pulley 176. As the pulleys 306, 308 are rotated, the shafts turn pulleys 176 in the directions shown by arrows in FIG. 9B. As a result, the belts 170 around the pulleys 172, 176 are also set into motion. Because there is a greater friction between the rubber belts 170 and the packaging tube 50 than there is between the packaging tube 50 and the fill pipe 22 (not shown), the contact between the pulleys 172, 176 and the packaging tube 50 allows the packaging tube 50 to be pulled through the packaging machine.

FIG. 10A is a schematic representation of the transverse sealing subassembly 220 of the present packaging machine. As shown in FIG. 10A, the pressure jaws 38 are located along a pair of chains 32, and the heated jaws 36 are located along a pair of chains 34. The tube 50 of stock material is pulled downwardly through the traverse sealing subassembly 220. A first pressure jaw 38 and a first heated jaw 36 come into contact with one another, as shown, during the rotation of their respective chains along an oval path. The chains 32, 34 carrying the pressure jaws 38 and the heated jaws 36, respectively, rotate in opposite directions, due to their placement within the transverse sealing subassembly 220.

The motion of the chains 32, 34 causes a rolling contact between the heated jaw 36 and the pressure jaw 38. Initially, the lower edges of the faces of the pressure jaw 38 and the heated jaw 36 come into contact with each other, and the subsequent increasing contact between the jaws 36, 38 forces the product (for example, the liquid contents) out of the transverse seal area (that is, the area between the jaws 36, 38). The removal of the product from the seal area enables a consistent transverse seal to be made across the width of the package, as the heated jaw 36 heats the tube 50 in the area of the seal, causing the meltable coating on the interior of the stock material to become molten.

Simultaneously, the pressure jaw 38 pushes the molten seal areas together, so that a strong, uniform seal 6 is made. The temperature of the heated jaw 36 at its face is typically between about 250° F. and 450° F., depending upon the stock material 12 being used. The force applied by the pressure jaw 38 over the contact area is typically from about 200 pounds to about 800 pounds. Generally, the dwell time of the packaging material in the area of transverse seal formation is approximately from about 0.1 seconds to about 1 second, depending on the speed of the packaging machine.

As discussed previously, in the formation of tetrahedral packages, an additional set of heated jaws 36 and pressure jaws 38 are located perpendicularly to those shown in the illustration, each respectively located along its own pair of roller chains (as will be described with reference to FIG. 11). These perpendicularly oriented sets of heated jaws and pressure jaws form the transverse seals 8, in the same manner as described above for transverse seals 6.

Although the conveying mechanisms for the jaws 36, 38 are shown as roller chains, other mechanisms may be used, including, for example, solid belts, belts perforated with openings for receiving the jaws, flat chains, linked chains, O-ring chains, and the like. If belts are used, it may be desirable to make the belts from stainless steel to prevent stretching with use, which could cause misalignment of the jaws.

FIG. 10A also illustrates a closed-loop, modified electrical system 140, which powers the heated jaws 36. Each heated jaw 36 includes an electrical contact-containing back 510 having at least a pair of electrical contacts, which creates an electrical connection between a heater cartridge inside the heated jaw 36 and the power rails 140. A pair of power rails 140 is provided, at least one of which is configured with a base level portion 142 and a power-correction portion 144. The base level portion 142 of the power rails 140, which comprises the majority of the length of the power rails, maintains at least a minimum energy level necessary to power the heater cartridges within the heated jaws 36. The power-correction portion 144 of the power rails 140 comprises a length on the power rails that is approximately equal to one pitch (that is, the distance between two adjacent heated jaws 36). The power-correction portion 144 supplies additional energy to any heated jaw 36 that has a temperature measurement that is lower than the target temperature for the heated jaws 36. The power-correction portion 144 of the power rails 140 needs only to be long enough to be in contact with one jaw 36 at a time.

The power rails 140 are controlled by a programmable logic controller (or "PLC") 260 that includes a data transmission reader (not shown). When the heated jaw 36 passes a stationary antenna 270, the wireless transmitter 280 is activated, at which time the thermocouple on the heated jaws 36 takes multiple temperature measurements across the jaw face. These measurements are then transmitted via a wireless transmitter 280 (shown in more detail in FIGS. 12 and 13) back to the stationary antenna 270. The stationary antenna 270 is mounted in close proximity (for example, between 0.375 inches and 0.5 inches) to the path of the heated jaws 36. From the antenna 270, the data is transmitted to the PLC 260, which determines whether an adjustment needs to be made.

In practice, the PLC 260 compiles data for all of the heated jaws 36 on a particular pair of chains and makes adjustments to either the base level portion 142 of the power rails 140 or the power-correction portion 144 of the power rails 140. If a particular heated jaw 36 exhibits temperature readings that are lower than the other heated jaws 36, the PLC 260 increases the power in the power-correction portion 144 of the power rails 140, when that particular heated jaw 36 contacts the power-correction portion 144. If all of the heated jaws 36 exhibit lower-than-desired temperatures, then the PLC 260 will increase the power in the base level portion 142 of the power rails 140. Adjustments to the base level portion 142 of the power rails 140 are made by setting the heated jaw 36 with the highest temperature at the desired temperature for all of the heated jaws 36.

Conversely, if all of the heated jaws 36 exhibit higher-than-desired temperatures, then the PLC 260 may decrease the power in the base level portion 142 of the power rails 140. In this way, the transverse sealing subassembly 220 provides independent control for consistent temperatures across the face of the heated jaws 36 and from jaw-to-jaw, thereby ensuring that consistent seals are formed in the transverse direction from package to package. Ideally, the temperature variation across the face of the heated jaws 36 and among the heated jaws 36 is no more than about 10° F. (or about 5° C.). The heated jaws on the other pair of chains are similarly controlled by the PLC 260.

FIGS. 10B and 10C illustrate the back 510 of the heated jaws and the electrical system 140 of FIG. 10A. As shown in FIG. 10B, the back 510 of the heated jaws includes a pair of electrical contacts 141' and 142'. FIG. 10C is an isometric representation of the electrical system 140, showing the positioning of seven heated jaws around the power rails 141, 142. Although seven heated jaws are shown, any number of jaws may be used. Power rail 141 may be an electrified rail or may be a neutral rail; for the sake of discussion herein, this rail will be referred to as a "common" rail. Power rail 142 is an electrified rail, which has a power-correction portion 144. As discussed above, the power-correction portion 144 has a length that is approximately equal to one pitch (that is, the length between two adjacent heated jaws). Electrical contact 141' is in contact with power rail 141, and electrical contact 142' is in contact with power rail 142.

FIGS. 10D, 10E, and 10F illustrate an alternate embodiment to the heated jaws and electrical system shown in FIGS. 10B and 10C. In this embodiment, an even number of heated jaws are used, half of the heated jaws having a back 612 with two electrical contacts 341', 342' and the other half of the heated jaws having a back 614 with two electrical contacts 341', 346'. As illustrated, the heated jaws each have an electrical contact 341', which is commonly positioned and which contacts common rail 341.

FIG. 10F is an isometric representation of an electrical system 340, showing the positioning of eight heated jaws around three power rails 341, 342, and 346. The heated jaws are arranged in an alternating configuration, such that a heated jaw with back 612 is positioned between heated jaws with back 614 (and vice versa). Power rail 342 includes a power-correction portion 344, and power rail 346 includes a power-correction portion 348. Because each heated jaw is powered by a different pair of power rails than its adjacent jaws—for example, a first jaw is powered by rails 341, 342, and its adjacent jaws are powered by rails 341, 346—the power-correction portions 344, 348 may be extended, in length, to approximately twice the pitch between adjacent jaws. Thus, two adjacent jaws may be corrected simultaneously, and the length of time available to correct the power for the heated jaws is twice as long as the arrangement shown in FIGS. 10A and 10C.

FIGS. 10G, 10H, 10I, and 10J illustrate yet another embodiment of heated jaws and a corresponding electrical system 540, in which the number of heated jaws is divisible by three. FIGS. 10G, 10H, and 10I represent the backs 710, 712, and 714 of three heated jaws, which are arranged sequentially around power rails 541, 548, 546, and 542 (shown in FIG. 10J). Each of the heated jaws has a common electrical contact 541', which contacts common rail 541. The back 710 of the heated jaw of FIG. 10G includes electrical contacts 541' and 542' and represents jaws that are powered by contact with power rails 541, 542. The back 712 of the heated jaw of FIG. 10H includes electrical contacts 541' and 546' and represents jaws that are powered by contact with power rails 541, 546. The back 714 of the heated jaw of FIG. 10I includes electrical contacts 541' and 548' and represents jaws that are powered by contact with power rails 541 and 548.

As shown in FIG. 10J, power rails 542, 546, and 548 include power-correction portions 543, 547, and 549, respectively. The power-correction portions 543, 547, and 549 may be extended, in length, to approximately three times the pitch between adjacent jaws. Thus, three jaws may be corrected simultaneously, and the length of time available to correct the power for the heated jaws is three times as long as the arrangement shown in FIGS. 10A and 10C.

Although the electrical systems described above represent various embodiments that may be successfully employed, it should be understood that numerous variations may instead be used, including a system having an n+1 number of rails, where n is the number of heated jaws. In such a system, each heated jaw is powered by its own dedicated power rail, and all of the heated jaws share a common rail. Using this approach, the power rails may be constantly adjusted during real-time, as measurements indicate are necessary.

Further, although the electrical contacts have been illustrated as being spring-loaded, other types of electrical contacts may be used, including, without limitation, contacts that straddle the power rails and contacts that slide along the power rails in contact with one or both edges of the rails.

FIG. 11 illustrates the arrangement of multiple heated jaws 36 and pressure jaws 38 and the positioning of the stock material tube 50, as it is conveyed through the transverse sealing subassembly. For ease of illustration, each pair of chains 32, 34, 35 is represented as a single chain. Each of the pair of chains 33 is shown. A first set of heated jaws 36 is located along a pair of chains 34, while the cooperative set of pressure jaws 38 is located along a pair of chains 32. A second set of heated jaws is conveyed along chains 35, while its cooperative set of pressure jaws 38 is conveyed along chains 33. To create the perpendicular transverse seals 6, 8 that are characteristic of a tetrahedral container 2, the respective sets are perpendicular to one another and are spaced one package length apart from one another. Along each chain 32, 33, 34, 35, the jaws 36 or 38 are positioned two package lengths apart from each other, so that the transverse seals 6, 8 are appropriately spaced.

The longitudinal fin seal 4 is visible as the stock material tube 50 enters the transverse sealing area. As indicated by phantom lines, fin folding guide 60 contacts the longitudinal fin seal 4 and pushes it against the tube 50. In those instances where a meltable coating is present on the outside of the stock material, the formation of the transverse seals 6, 8 tends to melt the fin seal 4 (in the area of the transverse seal) into position against the package. In instances where a manufacturer chooses to produce a pillow-shaped package 2', only one set of opposed heated jaws 36 and pressure jaws 38 is necessary. In both instances, depending on the desired package size, the size, number, and position of the heated jaws 36 and pressure jaws 38 may be adjusted.

FIGS. 12 and 13 illustrate two different versions of a heated jaw (identified as 36 and 436).

As shown in FIG. 12, the heated jaw 36 includes a heated jaw base 290, which connects to chains 34 or 35. The heated jaw 36 includes a heated jaw block (made of face component 296 and rear component 298) that houses a heater cartridge 284 with uniform power density. The rear component 298 of the heated jaw block is attached to an insulator block 294, which couples with a transmitter housing 282 at one end of the insulator block 294. The wireless, digital transmitter 280 is positioned within the transmitter housing 282, which (along with the insulator block 294) is attached to base 290. The electrical contacts are attached to the back 510 of the base 290 via intermediate insulating washers.

A thermocouple 281 for measuring the temperature of the jaw face is positioned inside an axially bored channel that terminates in the approximate center of the heated jaw block 296 as close to the jaw face as possible. Readings from the thermocouple are transferred to the wireless digital transmitter 280, which is held in a transmitter housing 282. As described previously with reference to FIG. 10, the wireless transmitter 280 digitally transmits the data to a stationary antenna 260, which relays the information to a reader and programmable logic controller 270. These wireless transmitters 280, which are manufactured by MicroStrain, Inc. of Williston, Vt., are accurate, precise, and reliable and show little variation or drift over long periods of use.

The wiring for the heater cartridge 284 is threaded through the insulator block 294 and is terminated within the spacer 292. Within the base 290 is an electrical connection housing, which includes a pair of electrical contacts 510 that contact the power rails described previously.

FIG. 13 illustrates a second version of the heated jaw 36. In these Figures, the heated jaw is identified as heated jaw 436. Connected to the base 490 is a spacer 492 (which may optionally be formed into the base 490). An insulator block 494 is connected to, and is positioned between, the spacer 492 and a heated jaw block 496. The heated jaw block 496 includes a jaw face, a thermally conductive core 495, and a heater cartridge 484. The heater cartridge 484 is surrounded by a thermally conductive core 495 and is held in position by a cartridge holder 485. The heater cartridge 484 has a variable power density, resulting from the localized placement of the heater coils at each end of the cartridge. Such a configuration is useful to combat heat loss at the respective ends of the heated jaw block 496 and to ensure uniform heat transfer across the jaw face (as the heat is distributed evenly by the thermally conductive core 495).

The thermally conductive core 495 is made of a material that is highly thermally conductive (that is, which exhibits a high k value indicative of ability to conduct heat). For this purpose, the core is preferably made of copper, aluminum, gold, silver, antimony, zirconium, tungsten, alloys of such metals, and the like. Aluminum and copper are the most cost-effective materials. Preferably, the thermally conductive core 495 is copper or a copper-containing alloy, because of its high thermal conductivity. The thermally conductive core 495 promotes uniform heating across the face of the heated jaw 436 and also facilitates the maintenance of the face of the heated jaw 436 at the desired temperature.

Heated jaw 436 operates on the same basic principles as heated jaw 36. In FIG. 16, the wiring from the transmitter 480, which is connected to a thermocouple, is positioned inside a bored channel in the heated jaw face 496. The temperature readings from the thermocouple 481 are transmitted digitally from the transmitter 480 to the antenna 270 (shown in FIG. 10). The wiring of the heater cartridge 484 is threaded through the insulator block 494 and support component 492 before being attached on the back of the base 490 to two or more electrical contacts that contact the power rails described previously.

In the case of both heated jaw 36 and heated jaw 436, the heated jaw face is preferably made of a hard, thermally stable material, such as heat-treated stainless steel having a hardness value on the Rockwell-C hardness scale of about HRC 58. It was found that other materials, such as heat-treated brass, for example, having a hardness value of HRC 27, lacked the hardness to resist damage from repeated contact with the pressure jaws. In those instances where the stock material includes a meltable coating on the outside, it may be desirable to use a heated jaw face with a non-stick coating to facilitate release of the transverse seals from the heated jaws.

The patterned jaw face, as illustrated, using multiple intersecting lines, promotes seal integrity by providing a plurality of channels inside the tube of packaging material through which the liquid contents may be pushed upward as the transverse seal is made. It should be noted that the patterns in the jaw face are formed in the transverse seals on the package and, thus, may be desirably modified for aesthetic purposes as well as functionality, taking the properties of the stock material into consideration.

The concept of package "headspace" is familiar to those skilled in the art of intermittent-fill packaging. In packages such as milk cartons, headspace is the area filled with air between the level of the product and the top of the container. In continuous fill packaging, such as is presently described, the filled packages have no headspace, because there is no air in the filled packages. However, to mimic the effect of having a headspace, it may be desirable under some circumstances to create a "false headspace" by slightly compressing the package as it is being sealed.

This false headspace may be achieved by the addition of curved plates 422, 488 to the top and bottom of the heated jaw 436. The upper headspace plate 422 is attached to mounting plate 420, while the lower headspace plate 488 is attached to a mounting plate 498 on the bottom of the heated jaw 436. The mounting plates 420, 498 are attached to the insulator block 494, which prevents the headspace plates 422, 488 from becoming heated by contact with the heater jaw block 496. If the headspace plates 422, 488 become heated, as in previous false-headspace mechanism designs, their contact with the stock material may damage the appearance of the stock material (for instance, if the outside of the packaging material is printed, it may be smeared by heat from the headspace plates).

The headspace plates 422, 488 engage the tube of packaging material and slightly compress the tube, just before formation of the transverse seals. This compression results in the sealed package being under tension, such that, when the package is opened, a slight vacuum is formed. As a result, the package contents are "pushed" into the bottom of the package by air rushing into the package, thus preventing the contents from splashing out onto the consumer.

FIG. 14 illustrates a pressure jaw 38, which acts in cooperative relation with either the heated jaw 36 or the heated jaw 436. The pressure jaw 38 is a much simpler element, including a base 390 and a pressure jaw face 396. The pressure jaw face 396 may be made of different materials, depending upon the stock material being used for the packages. For example, if the stock material is a coated paper, the pressure jaw face 396 may be stainless steel. If the stock material is a multi-layer film, then the pressure jaw face 396 may be made of rubber or a rubber-like material. In either instance, the pressure jaw face 396 is preferably made from a heat resistant, resilient, and durable material. When the pressure jaw face 396 is rubber or rubber-like, it may be made in a domed shape, such that the compression of the pressure jaw 38 against the heated jaw 36 helps to force the product contents out of the seal area.

FIGS. 15A, 15B, and 15C are representative of various stock materials useful for making packages in accordance with the teachings herein. In each Figure, the top layer represents the outermost layer of the packaging container. FIG. 15A illustrates a multi-layer film structure 600, in which the outermost layer is a polymer film layer 602. The polymer film layer 602 may be printed on either side, although, for many applications, reverse printing on the lower side of the polymer film layer 602 may be preferable. The central layer in the multi-layer film structure 600 is a polymer film 606 that is surrounded on each side by a relatively thin film layer 604. The relatively thin film layer 604 acts as a binder for the other layers. The polymer film 606 may be metallized or otherwise treated for barrier properties, as desired. A meltable sealant film layer 608 forms the innermost layer of the structure 600.

Polyester films are well-suited for layers 602, 606, though other polymers (such as polypropylene or nylon) may be used instead. These layers 602, 606 preferably have a thickness in the range of about 48 gauge, but other thicknesses may be used.

FIG. 15B illustrates a multi-layer foil structure 650, in which the outermost layer is a polymer film layer 652. As before, the polymer film layer 652 may be printed only either side. The central layer in the multi-layer foil structure 650 is a foil 656 that is surrounded on each side by relatively thin film layers 654, 658. It may be desirable to make the film layer 654 an opaque layer (such as a white layer), so that the foil layer 656 is not apparent from the outside of the package. A meltable sealant film layer 660 forms the innermost layer of the structure 650.

FIG. 15C illustrates a multi-layer coated paper structure 680, in which the outermost layer is a coated paper layer 682. A tie layer 688 connects the coated paper layer 682 to a barrier film 684 that is positioned on the back side of the coated paper layer 682. As with the other multi-layer stock materials, a meltable sealant film 686 forms the innermost layer of the structure 680. The paper layer 682 preferably contains an outer coating, which protects the outside of the packaging container.

When making packages having a longitudinal fin seal, such as those described herein, it is unnecessary to have a meltable coating or layer on the outermost side of the packaging material. This advantage is due to the inside-to-inside sealing of the packaging material, which requires only that the innermost layer of the stock material be meltable. Thus, any printing applied to the face of the outermost layer is maintained throughout the sealing and filling process without being smeared.

Although reference has been made throughout this description to the package contents as being consumable foodstuffs, it should be readily apparent to those of skill in the art that the packages and equipment described herein are equally useful in packaging inedible products, such as adhesives, caulks, detergents, and the like.

We claim:

1. A heated jaw for a continuous fill packaging machine, said heated jaw comprising (a) a base, optionally having a separable support component attached thereto; (b) an insulator block attached to said base; (c) a heated jaw block attached to said insulator block on a side opposite said base, said heated jaw block comprising a heated jaw face, a heater cartridge embedded in said heated jaw block, and an axially bored channel proximate to the heated jaw face; (d) a thermocouple embedded in the axially bored channel to measure the temperature of the heated jaw face; and (e) a wireless transmitter connected to said thermocouple and attached to said base to transmit the temperature of the heated jaw face to an antenna.

2. The heated jaw of claim 1, wherein the heated jaw face has a patterned surface created by a plurality of lines engraved therein.

3. The heated jaw of claim 1, wherein the heated jaw face is comprised of heat-treated stainless steel.

4. The heated jaw of claim 1, wherein the heated jaw face is coated with a non-stick coating.

5. The heated jaw of claim 1, wherein said heated jaw face comprises a face component and a rear component between which components said heater cartridge is positioned.

6. The heated jaw of claim 1, wherein said heater cartridge is a uniform power density cartridge.

7. The heated jaw of claim 1, wherein said heater cartridge is a variable power density cartridge.

8. The heated jaw of claim 1, wherein said heater cartridge is embedded in a thermally conductive core before being embedded in said heated jaw block.

9. The heated jaw of claim 8, wherein said thermally conductive core is comprised of copper.

10. The heated jaw of claim 1, further comprising a first headspace plate that is attached at a proximal end to the top of said insulator block and a second headspace plate that is attached at a proximal end to the bottom of said insulator block, the distal ends of each of said headspace plates extending angularly over the heated jaw face.

11. The heated jaw of claim 1, wherein said wireless transmitter is held in a transmitter housing.

\* \* \* \* \*